United States Patent
Paulucci et al.

(10) Patent No.: US 12,025,176 B2
(45) Date of Patent: Jul. 2, 2024

(54) CLIP FASTENER FOR PRIVACY SCREEN

(71) Applicant: Steelcase Inc., Grand Rapids, MI (US)

(72) Inventors: Daniel Paulucci, Grandville, MI (US); Yuka Hiyoshi, Grand Rapids, MI (US)

(73) Assignee: Steelcase Inc., Grand Rapids, MI (US)

( * ) Notice: Subject to any disclaimer, the term of this patent is extended or adjusted under 35 U.S.C. 154(b) by 317 days.

(21) Appl. No.: 17/204,538

(22) Filed: Mar. 17, 2021

(65) Prior Publication Data

US 2022/0299052 A1 Sep. 22, 2022

(51) Int. Cl.
*F16B 5/06* (2006.01)
*A47B 97/00* (2006.01)

(52) U.S. Cl.
CPC .......... *F16B 5/0635* (2013.01); *F16B 5/0614* (2013.01); *A47B 97/00* (2013.01); *F16B 2005/0678* (2013.01); *F16B 2200/30* (2018.08)

(58) Field of Classification Search
CPC .... F16B 5/0004; F16B 5/0028; F16B 5/0032; F16B 5/0052; F16B 5/01; F16B 5/06; F16B 5/0607; F16B 5/0614; F16B 5/0621; F16B 5/0635; F16B 2005/0678; F16B 2200/30; F16B 7/0493; A63H 33/062; A63H 33/101; Y10T 24/344; Y10T 24/44; Y10T 24/44017; Y10T 403/42; Y10T 403/57; Y10T 403/5733; Y10T 403/7043; Y10T 403/7096; Y10T 403/7105; Y10T 403/73; A47B 47/042; A47B 47/047; A47B 65/16; A47B 88/975; A47B 96/04; A47B 65/15; A47B 97/00; E04B 2/7405; E04B 2/7416; E04B 2002/7462
See application file for complete search history.

(56) References Cited

U.S. PATENT DOCUMENTS

| | | | |
|---|---|---|---|
| 1,398,852 A | 11/1921 | Gilbert |
| 1,706,388 A | 3/1929 | Ashkenas |
| 2,388,297 A | 11/1945 | Slaughter |
| 2,934,180 A | 4/1960 | Hammitt et al. |
| 2,942,924 A | 6/1960 | Stangert |
| 3,102,615 A | 9/1963 | Tuttle |
| 3,213,580 A | 10/1965 | Mark |
| 3,314,551 A | 4/1967 | Plastow |

(Continued)

FOREIGN PATENT DOCUMENTS

| | | |
|---|---|---|
| AU | 639108 B2 | 7/1993 |
| CH | 452145 A | 5/1968 |

(Continued)

*Primary Examiner* — Josh Skroupa
*Assistant Examiner* — Kevin J Baynes
(74) *Attorney, Agent, or Firm* — Quarles & Brady LLP

(57) ABSTRACT

The present disclosure provides systems and methods for a modular fastener assembly for use with multiple panel members. In some embodiments, the fastener assembly can include one or more fasteners (i.e., connectors, clips, etc.). Each of the fasteners can include a channel configured to receive an edge of a panel member, a coupling protrusion extending from an outer surface of the fastener, and an opening formed on another external surface of the fastener configured to be complementarily shaped to the coupling protrusion such that a coupling protrusion on another fastener can be received in the opening to secure two fasteners of the fastener assembly together.

14 Claims, 32 Drawing Sheets

(56) References Cited

U.S. PATENT DOCUMENTS

| | | | |
|---|---|---|---|
| 3,460,282 A * | 8/1969 | Swirsky | B42D 5/04 |
| | | | 24/581.1 |
| 3,460,860 A | 8/1969 | Stevens, Jr. | |
| 3,463,218 A | 8/1969 | Cannon et al. | |
| 3,486,287 A | 12/1969 | Guillon | |
| 3,490,800 A * | 1/1970 | Wissler | E04B 2/56 |
| | | | D25/120 |
| 3,528,559 A | 9/1970 | Miller | |
| 3,563,582 A | 2/1971 | Shroyer | |
| 3,592,289 A | 7/1971 | Aysta et al. | |
| 3,596,942 A | 8/1971 | Zoebelein | |
| 3,659,389 A | 5/1972 | Forberg | |
| 3,662,807 A | 5/1972 | Miller | |
| 3,680,898 A | 8/1972 | Herrmann | |
| 3,687,512 A | 8/1972 | Alston | |
| 3,766,692 A | 10/1973 | Stark et al. | |
| 3,791,091 A | 2/1974 | Albrizzi | |
| 3,819,188 A * | 6/1974 | Freedman | A63F 9/12 |
| | | | 446/124 |
| 3,827,177 A | 8/1974 | Wengel | |
| 3,848,383 A | 11/1974 | Wilson et al. | |
| 3,854,269 A | 12/1974 | Hancock | |
| 3,883,258 A | 5/1975 | Hewson | |
| 3,960,637 A * | 6/1976 | Ostrow | E04C 3/292 |
| | | | 52/841 |
| 3,977,800 A | 8/1976 | Cassel | |
| 3,989,157 A * | 11/1976 | Veenema | B65D 9/34 |
| | | | 217/65 |
| 3,991,535 A * | 11/1976 | Keller | E04C 3/127 |
| | | | 52/642 |
| 3,998,002 A | 12/1976 | Nathanson | |
| 3,998,509 A * | 12/1976 | Hauser | A47F 3/12 |
| | | | D6/661 |
| 4,019,302 A * | 4/1977 | Meyer | E04C 3/292 |
| | | | 52/843 |
| 4,025,216 A | 5/1977 | Hives | |
| 4,101,231 A | 7/1978 | Streib | |
| 4,118,903 A | 10/1978 | Coulthard | |
| 4,126,978 A | 11/1978 | Heller | |
| 4,166,332 A | 9/1979 | Donovan | |
| 4,191,000 A * | 3/1980 | Henderson | E04C 3/14 |
| | | | 52/837 |
| 4,195,462 A * | 4/1980 | Keller | E04C 3/29 |
| | | | 52/690 |
| 4,200,254 A | 4/1980 | Nelson | |
| 4,249,355 A * | 2/1981 | Anderson | E04C 3/14 |
| | | | 52/642 |
| 4,258,464 A | 3/1981 | Ullman, Jr. | |
| 4,263,761 A | 4/1981 | Kristoff | |
| 4,292,003 A | 9/1981 | Pond | |
| 4,296,524 A | 10/1981 | Horholt et al. | |
| 4,322,572 A | 3/1982 | Snyder | |
| 4,334,868 A | 6/1982 | Levinrad | |
| 4,353,663 A | 10/1982 | Glickman | |
| 4,357,119 A | 11/1982 | Pollitt | |
| 4,365,454 A | 12/1982 | Davis | |
| 4,402,117 A | 9/1983 | Kitagawa | |
| 4,403,885 A | 9/1983 | Babb | |
| 4,449,662 A | 5/1984 | Okamura et al. | |
| 4,470,647 A | 9/1984 | Bishoff et al. | |
| 4,491,166 A | 1/1985 | Hanna | |
| 4,531,564 A | 7/1985 | Hanna | |
| D283,446 S * | 4/1986 | Burkinshaw | D25/125 |
| 4,593,508 A | 6/1986 | Curatolo | |
| 4,594,829 A | 6/1986 | Herrgord | |
| 4,616,571 A | 10/1986 | Lange | |
| 4,619,365 A | 10/1986 | Kelly et al. | |
| 4,634,309 A | 1/1987 | Dewey | |
| 4,644,993 A | 2/1987 | Cooper et al. | |
| 4,652,170 A * | 3/1987 | Lew | F16B 12/02 |
| | | | 403/171 |
| 4,676,038 A | 6/1987 | Doyon et al. | |
| 4,703,603 A | 11/1987 | Hills | |
| 4,712,336 A | 12/1987 | Backer | |
| 4,785,565 A | 11/1988 | Kuffner | |
| 4,787,553 A | 11/1988 | Hoskins | |
| 4,828,132 A | 5/1989 | Francis, Jr. et al. | |
| 4,870,769 A | 10/1989 | Ogilvie | |
| 4,928,465 A | 5/1990 | Del Castillo Von Haucke | |
| 4,936,068 A | 6/1990 | VictorSchonfeld et al. | |
| 4,942,709 A | 7/1990 | Waldron | |
| 4,962,805 A | 10/1990 | Allen | |
| 4,968,171 A | 11/1990 | Shell | |
| 4,977,696 A | 12/1990 | Johansson | |
| 5,067,294 A | 11/1991 | McGowan | |
| D322,859 S | 12/1991 | Wurth et al. | |
| 5,103,741 A | 4/1992 | Grund et al. | |
| 5,105,594 A | 4/1992 | Kirchner | |
| 5,172,534 A | 12/1992 | Milner et al. | |
| 5,187,843 A | 2/1993 | Lynch | |
| 5,251,996 A | 10/1993 | Hiller et al. | |
| 5,267,425 A * | 12/1993 | Onysko | E04C 3/14 |
| | | | 403/381 |
| 5,267,863 A * | 12/1993 | Simmons, Jr. | A63F 9/0613 |
| | | | 434/96 |
| 5,277,512 A | 1/1994 | Dwillies | |
| 5,323,584 A * | 6/1994 | Scarlett | E04C 3/14 |
| | | | 52/847 |
| 5,350,331 A | 9/1994 | Glickman | |
| 5,381,845 A | 1/1995 | Ruggie et al. | |
| D361,631 S | 8/1995 | King | |
| 5,477,594 A | 12/1995 | LePage | |
| 5,487,690 A | 1/1996 | Stoffle et al. | |
| 5,520,477 A * | 5/1996 | Fink | F16B 5/0028 |
| | | | 403/231 |
| 5,531,539 A | 7/1996 | Crawford | |
| 5,558,241 A * | 9/1996 | Huffstutler, Jr. | B65D 11/1833 |
| | | | 220/4.31 |
| 5,560,413 A | 10/1996 | Brown | |
| 5,605,486 A | 2/1997 | Zheng | |
| 5,640,816 A | 6/1997 | Reiland et al. | |
| D391,843 S | 3/1998 | Glickman et al. | |
| 5,729,867 A | 3/1998 | Carmichael | |
| D393,417 S | 4/1998 | Glickman et al. | |
| D395,365 S | 6/1998 | Verbeek et al. | |
| 5,771,954 A | 6/1998 | Benner et al. | |
| 5,775,046 A * | 7/1998 | Fanger | A47B 81/061 |
| | | | 108/158.12 |
| 5,868,537 A | 2/1999 | Latal et al. | |
| 5,875,596 A | 3/1999 | Muller | |
| 5,875,597 A | 3/1999 | Gingrich et al. | |
| 5,890,782 A | 4/1999 | Alberts | |
| 5,901,859 A | 5/1999 | Carr et al. | |
| 5,928,051 A | 7/1999 | Krog | |
| 5,957,182 A | 9/1999 | Ahlberg | |
| 5,983,583 A * | 11/1999 | Mattix | E04F 13/18 |
| | | | 52/282.4 |
| D421,655 S | 3/2000 | Daugherty et al. | |
| D422,796 S | 4/2000 | Milligan et al. | |
| 6,061,972 A | 5/2000 | Thorp | |
| 6,082,837 A | 7/2000 | Battochio et al. | |
| 6,082,838 A | 7/2000 | Bissu-Palombo | |
| 6,095,715 A * | 8/2000 | Hulls | E04C 2/526 |
| | | | 403/231 |
| 6,116,326 A | 9/2000 | Domina et al. | |
| 6,141,926 A | 11/2000 | Rossiter et al. | |
| 6,161,320 A | 12/2000 | Peterson | |
| 6,200,062 B1 | 3/2001 | You | |
| 6,325,694 B1 | 12/2001 | Clever et al. | |
| 6,431,436 B1 * | 8/2002 | Evers | B65D 21/0201 |
| | | | 206/821 |
| 6,435,106 B2 | 8/2002 | Funk et al. | |
| 6,453,826 B1 | 9/2002 | Fookes et al. | |
| 6,546,675 B1 | 4/2003 | Adderton | |
| 6,553,724 B1 * | 4/2003 | Bigler | E04B 2/7425 |
| | | | 403/DIG. 1 |
| D474,513 S | 5/2003 | Kichijo | |
| 6,578,759 B1 | 6/2003 | Ortiz | |
| 6,599,055 B2 | 7/2003 | Auer et al. | |
| 6,631,751 B2 | 10/2003 | Coles et al. | |
| 6,651,400 B1 | 11/2003 | Murphy | |
| 6,659,677 B1 | 12/2003 | Exposito | |

(56) References Cited

U.S. PATENT DOCUMENTS

| | | | |
|---|---|---|---|
| 6,718,709 B2 | 4/2004 | Koutras et al. | |
| 6,823,638 B2 * | 11/2004 | Stanchfield | E04F 15/02 |
| | | | 52/592.1 |
| 6,830,236 B2 * | 12/2004 | Augusto de Lorenzo | |
| | | | E01F 13/028 |
| | | | 403/324 |
| 6,854,233 B2 | 2/2005 | Pitsch et al. | |
| D513,471 S | 1/2006 | Sato et al. | |
| 7,047,576 B2 | 5/2006 | Tavivian | |
| D547,977 S | 8/2007 | Torrente Bonatti et al. | |
| D550,484 S | 9/2007 | Bonatti et al. | |
| 7,278,360 B2 | 10/2007 | Griepentrog | |
| 7,325,343 B2 | 2/2008 | Seiber et al. | |
| D575,143 S | 8/2008 | Kuo et al. | |
| 7,444,792 B2 | 11/2008 | Matson | |
| D596,482 S | 7/2009 | Marinucci | |
| 7,654,055 B2 * | 2/2010 | Ricker | A47B 47/0075 |
| | | | 52/592.1 |
| 7,690,158 B2 | 4/2010 | Kelly | |
| 7,753,320 B2 | 7/2010 | Geiger et al. | |
| 7,789,025 B2 | 9/2010 | Michaud, II et al. | |
| D626,823 S | 11/2010 | Wood | |
| D626,824 S | 11/2010 | Wood | |
| 7,922,417 B2 | 4/2011 | Jimenez | |
| D639,143 S | 6/2011 | Schaefer et al. | |
| D653,862 S | 2/2012 | Hairston | |
| D658,977 S | 5/2012 | Riddell et al. | |
| 8,221,042 B2 | 7/2012 | Vitali | |
| 8,225,723 B2 | 7/2012 | Nakamura et al. | |
| 8,245,477 B2 * | 8/2012 | Pervan | E04F 15/087 |
| | | | 52/592.1 |
| 8,316,781 B1 | 11/2012 | Majors | |
| D674,221 S | 1/2013 | Kim | |
| 8,376,166 B2 | 2/2013 | Kindig et al. | |
| D696,732 S | 12/2013 | Mimlitch, III et al. | |
| 8,613,153 B2 | 12/2013 | Ceurvels | |
| 8,641,315 B2 | 2/2014 | Liu et al. | |
| 8,656,617 B2 | 2/2014 | Ceurvels | |
| 8,887,354 B1 | 11/2014 | Weinman | |
| D719,821 S | 12/2014 | McGrath | |
| 8,904,706 B1 | 12/2014 | Smith | |
| 8,955,928 B2 | 2/2015 | Cheng | |
| 8,967,054 B2 | 3/2015 | Henriott et al. | |
| 8,968,046 B2 | 3/2015 | Cochella | |
| 9,038,261 B2 | 5/2015 | Renaud | |
| D732,703 S | 6/2015 | Kreutzman | |
| D744,817 S | 12/2015 | Hyakutake et al. | |
| 9,217,450 B2 | 12/2015 | Pettigrew et al. | |
| 9,220,342 B2 | 12/2015 | Byrne et al. | |
| 9,255,440 B2 | 2/2016 | Alexander et al. | |
| D757,860 S | 5/2016 | Cochella | |
| 9,347,213 B1 * | 5/2016 | Zhang | E04C 3/08 |
| 9,399,177 B2 | 7/2016 | Cochella | |
| 9,445,666 B2 * | 9/2016 | Chang | A47B 55/02 |
| 9,447,804 B2 | 9/2016 | Andersson et al. | |
| 9,782,688 B2 | 10/2017 | Cummings | |
| 9,790,980 B2 * | 10/2017 | McCarthy | F16B 37/045 |
| 9,810,253 B2 | 11/2017 | Koelling et al. | |
| 9,895,623 B2 | 2/2018 | Cochella | |
| 9,920,520 B2 | 3/2018 | Udagawa et al. | |
| 9,976,301 B2 | 5/2018 | Loffler et al. | |
| 10,058,789 B2 | 8/2018 | Styles | |
| 10,086,304 B1 | 10/2018 | LaChance, III | |
| D834,105 S | 11/2018 | Bilodeau et al. | |
| 10,136,726 B2 | 11/2018 | Stack | |
| 10,206,336 B2 | 2/2019 | Herrick | |
| D848,540 S | 5/2019 | Nilsson | |
| 10,398,997 B2 | 9/2019 | Cochella | |
| 10,398,998 B2 | 9/2019 | Cochella | |
| 10,398,999 B2 | 9/2019 | Cochella | |
| 10,422,126 B2 * | 9/2019 | Kupferberg | F16B 11/006 |
| 10,448,734 B2 | 10/2019 | Battey et al. | |
| 10,456,702 B2 * | 10/2019 | Dumphy | A63H 33/08 |
| D871,120 S | 12/2019 | Schalk et al. | |
| 10,493,371 B2 | 12/2019 | Cochella et al. | |
| D873,122 S | 1/2020 | Cho | |
| D877,263 S | 3/2020 | Cochella | |
| D880,175 S | 4/2020 | Gyllang | |
| 10,625,537 B1 | 4/2020 | Dawson et al. | |
| 10,669,711 B2 | 6/2020 | Parshad | |
| 10,669,713 B2 | 6/2020 | Feldpausch et al. | |
| 10,702,061 B2 | 7/2020 | Stack | |
| 10,744,916 B2 | 8/2020 | Agonia et al. | |
| 10,760,299 B2 | 9/2020 | Preston | |
| 11,160,376 B2 * | 11/2021 | Gass | A47B 97/00 |
| D979,662 S * | 2/2023 | Chen | A63H 33/08 |
| | | | D21/500 |
| 2004/0145283 A1 * | 7/2004 | Saravis | A47B 47/0033 |
| | | | 312/111 |
| 2004/0155562 A1 * | 8/2004 | Saravis | A47B 47/0091 |
| | | | 312/111 |
| 2004/0198141 A1 | 10/2004 | Buhrman et al. | |
| 2005/0016107 A1 * | 1/2005 | Rosenthal | E04F 15/04 |
| | | | 52/578 |
| 2005/0106989 A1 * | 5/2005 | Rincover | A63H 33/082 |
| | | | 446/85 |
| 2007/0151197 A1 | 7/2007 | Home | |
| 2007/0240285 A1 | 10/2007 | Caspi et al. | |
| 2008/0080930 A1 | 4/2008 | Truijens | |
| 2008/0213040 A1 | 9/2008 | Morze-Reichartz | |
| 2009/0274512 A1 | 11/2009 | Tavivian | |
| 2010/0065612 A1 | 3/2010 | Kocik et al. | |
| 2010/0079045 A1 | 4/2010 | Yeh | |
| 2011/0239505 A1 | 10/2011 | Fink | |
| 2011/0255915 A1 | 10/2011 | Chen et al. | |
| 2011/0260592 A1 | 10/2011 | Lin et al. | |
| 2012/0028534 A1 | 2/2012 | Unger | |
| 2012/0217355 A1 | 8/2012 | Geiger et al. | |
| 2012/0304441 A1 | 12/2012 | Henriott | |
| 2012/0305203 A1 | 12/2012 | Verbeek et al. | |
| 2013/0019560 A1 | 1/2013 | Marinucci | |
| 2013/0064600 A1 | 3/2013 | Tseng et al. | |
| 2013/0236243 A1 | 9/2013 | Personette et al. | |
| 2013/0239509 A1 | 9/2013 | Wang | |
| 2014/0045403 A1 | 2/2014 | Murphy | |
| 2014/0294498 A1 | 10/2014 | Logan | |
| 2015/0033648 A1 | 2/2015 | Hobeyn | |
| 2015/0147113 A1 | 5/2015 | Crabtree, II | |
| 2015/0240847 A1 | 8/2015 | Nosalik | |
| 2016/0108945 A1 | 4/2016 | Yang | |
| 2017/0023041 A1 | 1/2017 | Koelling et al. | |
| 2017/0023043 A1 | 1/2017 | Koelling et al. | |
| 2017/0037891 A1 | 2/2017 | Giovannetti | |
| 2018/0031276 A1 * | 2/2018 | Zabel | F24S 25/67 |
| 2018/0245334 A1 | 8/2018 | Udagawa et al. | |
| 2019/0119945 A1 * | 4/2019 | Grieshop | E04H 15/36 |
| 2019/0166990 A1 | 6/2019 | Stack | |
| 2019/0246790 A1 | 8/2019 | Horn et al. | |
| 2019/0365101 A1 | 12/2019 | Udagawa et al. | |
| 2021/0285478 A1 * | 9/2021 | Fan | F16B 5/0664 |

FOREIGN PATENT DOCUMENTS

| | | | |
|---|---|---|---|
| CN | 202933496 U | 5/2013 | |
| DE | 501152 C * | 6/1930 | F16B 2/22 |
| DE | 937614 C * | 1/1956 | F16B 5/0052 |
| DE | 19904432 A1 | 8/2000 | |
| EP | 0257799 B1 | 10/1993 | |
| EP | 2916014 A1 | 9/2015 | |
| GB | 1421371 A * | 1/1976 | F16B 2/22 |
| GB | 1489278 A * | 10/1977 | E04B 1/6112 |
| GB | 2381804 A | 5/2003 | |
| GB | 2381804 B | 10/2003 | |
| GB | 2463449 A | 3/2010 | |
| JP | 2857980 B2 | 2/1999 | |
| JP | 3319263 B2 | 8/2002 | |
| JP | 5101197 B2 | 12/2012 | |
| JP | 2013245699 A | 12/2013 | |
| KR | 100951043 B1 | 4/2010 | |
| KR | 20180001549 U | 5/2018 | |
| KR | 101890668 B1 | 8/2018 | |

(56) References Cited

FOREIGN PATENT DOCUMENTS

| | | | |
|---|---|---|---|
| WO | 8703321 | A1 | 6/1987 |
| WO | 2007008172 | A1 | 1/2007 |
| WO | 2010034467 | A1 | 4/2010 |

\* cited by examiner

CLIP FASTENER FOR PRIVACY SCREEN

CROSS-REFERENCE TO RELATED APPLICATIONS

Not applicable.

STATEMENT REGARDING FEDERALLY SPONSORED RESEARCH

Not applicable.

BACKGROUND OF THE DISCLOSURE

The field of the disclosure is space division and more specifically attachment mechanisms for light weight screen panels.

Many office facilities include workstations in open spaces. In many cases, while there are reasons why an employer may want employees to work in open spaces, at least a subset of employees may prefer at least some privacy when working at their workstations. For this reason, the office furniture industry has developed many different types of privacy screen assemblies for use at workstations. For instance, some privacy screen assemblies for use at a workstation that includes a rectangular worksurface may include three privacy panels mounted along a rear and two lateral edges of the worksurface to cut off direct viewing of an employee using the workstation from several angles within an open office space.

Many known privacy assemblies include complex structures that are difficult and expensive to manufacture and that require special tools and expertise to install. In addition, many known assemblies are designed for specific workstation applications and are not adaptable for different applications that require different panel sizes, numbers or arrangements.

What is needed is a simple panel and connector assembly that is simple and inexpensive to manufacture and that is simple to install and remove so that even an end user can install and remove the assembly from a workstation to meet user preferences. It would also be advantageous if the connectors where constructed so that the connectors have minimal visibility and so that panel edges and surfaces are coplanar.

SUMMARY OF THE DISCLOSURE

It has been recognized that a simple panel connector arrangement can be constructed where connectors can be attached to edges of panels and the connectors can be connected to each other to secure panel edges to each other to form multi-panel arrangements for use at workstations or more generally within open spaces to provide at least some privacy and space division. In some embodiments all the connectors are identical and each has at least a first coupler and a second coupler that compliments the first coupler so that the second coupler can mate and secure to the first coupler. For instance, in some cases a first coupler is a slot and a second coupler is a protrusion that is received within the slot to secure two connectors together. Each connector forms a channel that receives an edge of a panel and the couplers are arranged so that panels can be secured together and extend at 90 degrees with respect to each other or, in some cases, in a coplanar fashion.

In some aspects each connector may include one first coupler type and two second coupler types so that multiple connectors can be secured together to form a T or X shaped panel arrangement.

In some aspects the connectors may each have a uniform cross section and each may be extruded from plastic, a metal, or some other rigid and extrudable material.

In some aspects outer faces of each connector may have similar or substantially identical width and height dimensions and, when two clips are attached (e.g. when a first coupler is connected to a second coupler), the widths may be aligned so that the outer adjacent faces are aligned and hidden from view. In some cases the couplers are dimensioned and sized such that when first and second panels are supported at 90 degrees with respect to each other an edge of a first panel is coplanar with an outer surface of a second panel.

According to some aspects of the present disclosure, a fastener assembly for use with first and second panel members is provided. Each of the panel members forms an edge and includes a panel width dimension at the edge between first and second oppositely facing panel side surfaces. The fastener assembly includes first and second fasteners. Each of the first and second fasteners can include a base wall member, first and second sidewall members, a coupling protrusion, and an opening. The base wall member forms an outer surface and a floor surface, the outer surface having a base wall width dimension. The first and second sidewall members extend from the base wall. The first and second sidewall members include first and second facing internal surfaces, respectively. The first sidewall member forms a first external surface that is perpendicular to the outer surface and has a first wall width dimension that is substantially similar to the base wall width dimension. The facing internal surfaces and floor surface forms a channel having a width dimension that is substantially similar to the panel width dimension. The coupling protrusion extends from at least one of the outer surface and the first external surface. The other of the outer surface and the first external surface form an opening configured to receive the protrusion. With the coupling protrusion of one of the first and second fasteners received within the opening of the other of the first and second fasteners, the outer surface of the first fastener is immediately adjacent the first external surface of the second fastener with the base wall width dimension aligned with and extends along the length of the first wall width dimension.

According to some aspects of the present disclosure, a fastener assembly for use with first and second panel members is provided. Each of the panel members form an edge and having a panel width dimension at the edge between first and second oppositely facing panel side surfaces. The fastener assembly includes first and second fasteners, where each of the first and second fasteners having a substantially continuous cross sectional shape. Each of the first and second fasteners includes a base wall member and first and second sidewall members. The base wall member forms an outer surface and a floor surface, the outer surface having a rectangular shape, a base wall width dimension and a height dimension. The base wall includes a coupling protrusion extending from the outer surface. The first and second sidewall members extend from the floor surface, the first and second sidewall members including first and second facing internal surfaces, respectively, and forming first and second external surfaces, respectively, that are perpendicular to the outer surface and that are substantially parallel to teach other. Each external surface includes a rectangular shape and having width and height dimensions that are substantially similar to the width and height dimensions of the outer surface. The facing internal surfaces and floor surface form a channel having a width dimension that is substantially similar to the panel width dimension. The first and second external surfaces form slots that extend along the height dimensions of the first and second external surfaces. With the coupling protrusion received within one of the slots, the outer surface is immediately adjacent the external surface forming the one of the slots and with the rectangular shape of the external surface aligned with the outer surface.

According to some aspects of the present disclosure, a privacy screen assembly is provided. The privacy screen assembly includes a first panel assembly and a first fastener clip. The first panel assembly includes first and second opposite side surfaces and a panel width dimension between the first and second opposite side surfaces along an edge. The first fastener clip includes a base wall member, first and second sidewall members, and a channel protrusion. The base wall member forms a floor surface. The first and second sidewall members are spaced apart and extend from the base wall member in substantially the same direction. The first and second sidewall members includes first and second facing internal surfaces, respectively. The facing internal surfaces and floor surface form a channel having a channel width dimension between the facing internal surfaces that is less than the panel width dimension. The channel protrusion extends from the floor surface into the channel to a distal end along a trajectory that is substantially parallel to the first and second facing internal surfaces. The channel protrusion includes first and second surfaces that face the first and second internal surfaces, respectively. The edge is received within the channel with the distal end of the channel protrusion jammed into the edge of the panel assembly so that at least portions of the panel assembly are compressed between the channel protrusion and the facing internal surfaces of the first and second sidewall members.

DETAILED DESCRIPTION OF THE DISCLOSURE

Figure 1:
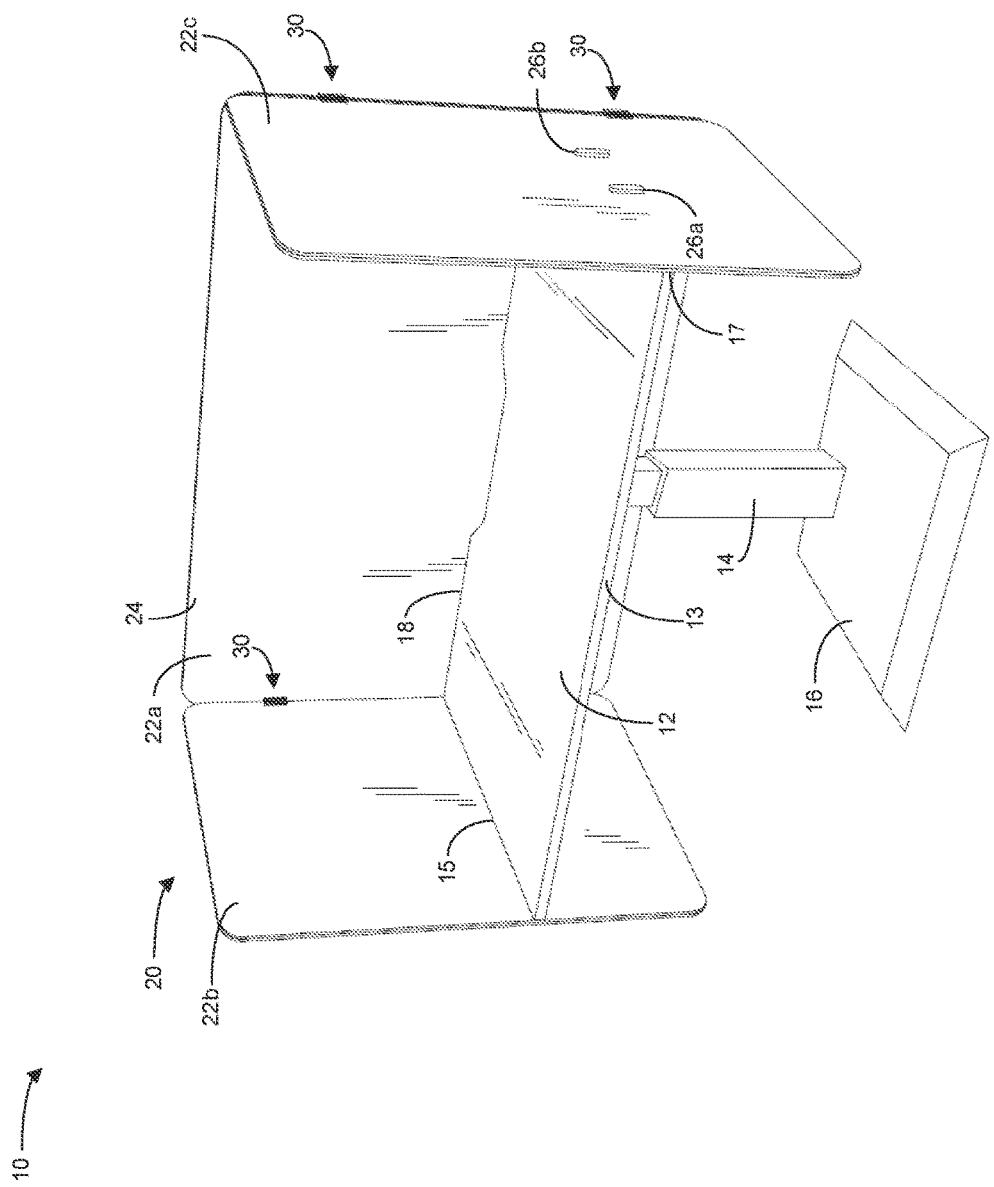
FIG. 1 is a front perspective view of a workstation including a privacy screen assembly according to one aspect of the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

In the following detailed description, reference is made to the accompanying drawings which form a part hereof, and in which is shown by way of illustration, specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular method, device, or system, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

The word "exemplary" is used herein to mean serving as an example, instance, or illustration. Any aspect or design described herein as "exemplary" is not necessarily to be construed as preferred or advantageous over other aspects or designs.

A simple arrangement of panels can be constructed where connectors can be attached to edges of panels, such that the connectors can be connected to each other to secure panel edges to each other to readily and easily form multi-panel arrangements for use at workstations. Here, it is useful to provide improved connectors or fastening arrangements that can be modular, allowing for a plurality of similarly shaped fasteners to be combined to form a fastening assembly to which multiple panels can be secured to.

As will be described herein, the present disclosure provides systems and methods for a fastener assembly for use with multiple panel members. In some embodiments, the fastener assembly can include one or more fasteners (i.e., connectors, clips, etc.). Each of the fasteners can include a channel configured to receive an edge of a panel member, a coupling protrusion extending from an outer surface of the fastener, and an opening formed on another external surface of the fastener configured to be complementarily shaped to the coupling protrusion such that a coupling protrusion on another fastener can be received in the opening to secure two fasteners of the fastener assembly together.

In some embodiments, the outer surface of one fastener is immediately adjacent an outer or external surface of another fastener. In some embodiments, the outer surfaces of the fasteners have substantially similar widths (i.e., defining a generally U-shaped profile in cross section, with even outer surface dimensions forming the U-shape). In some cases, this can result in at least one fastener being substantially hidden from view when a subject is at their workstation. That is, at least one fastener of the two fasteners, in this case, can be hidden from view when looking at an internal corner formed by two adjacent panels coupled with the fastener assembly. Thus, for example, a more attractive appearance can be presented, while providing a modular and easily interchangeable/adjustable panel assembly utilizing the fastener(s) described herein.

Referring now to the drawings wherein like reference numerals correspond to similar elements throughout the several views and, more specifically, referring to FIGS. 1 and 2, the present disclosure will be described in the context of an exemplary workstation assembly 10 that includes a panel assembly 20 including multiple panel members coupled together at adjacent edges using one or more fastener assemblies 30. The workstation assembly 10 can include a tabletop or worksurface member 12 supported by a leg assembly including foot member 16 and a pedestal subassembly 14 that extends from foot member 16 upward to an underside of worksurface 12 where the upper end of the pedestal assembly is attached to the worksurface 12. The exemplary pedestal assembly is shown as a telescoping height adjustable assembly but other worksurface supporting structures are contemplated.

The worksurface member 12 includes a circumferential edge that includes a front edge 13, a rear edge 18 and first and second lateral edges 15 and 17, respectively, where the edges define an essentially rectangular planar member. The rear edge 18 is scalloped at a midpoint for passing power and data cables from devices located above the worksurface to a space below the tabletop member.

The exemplary workstation 10 includes a panel assembly 20 or structure including one or more panel members 22. In the illustrated embodiment, the panel assembly 20 includes first, second and third substantially planar panel members 22a, 22b, and 22c, respectively. Each of the panel assemblies 22a, 22b, and 22c can be similarly constructed and operate in a similar fashion (albeit, they can have similar or different dimensions relative to one another). Therefore, in the interest of simplifying this explanation, only panel assembly 22a will be described here in detail. Unless indicated otherwise, panel assembly 22a will be referred to hereafter as a panel assembly 22.

Figure 7:
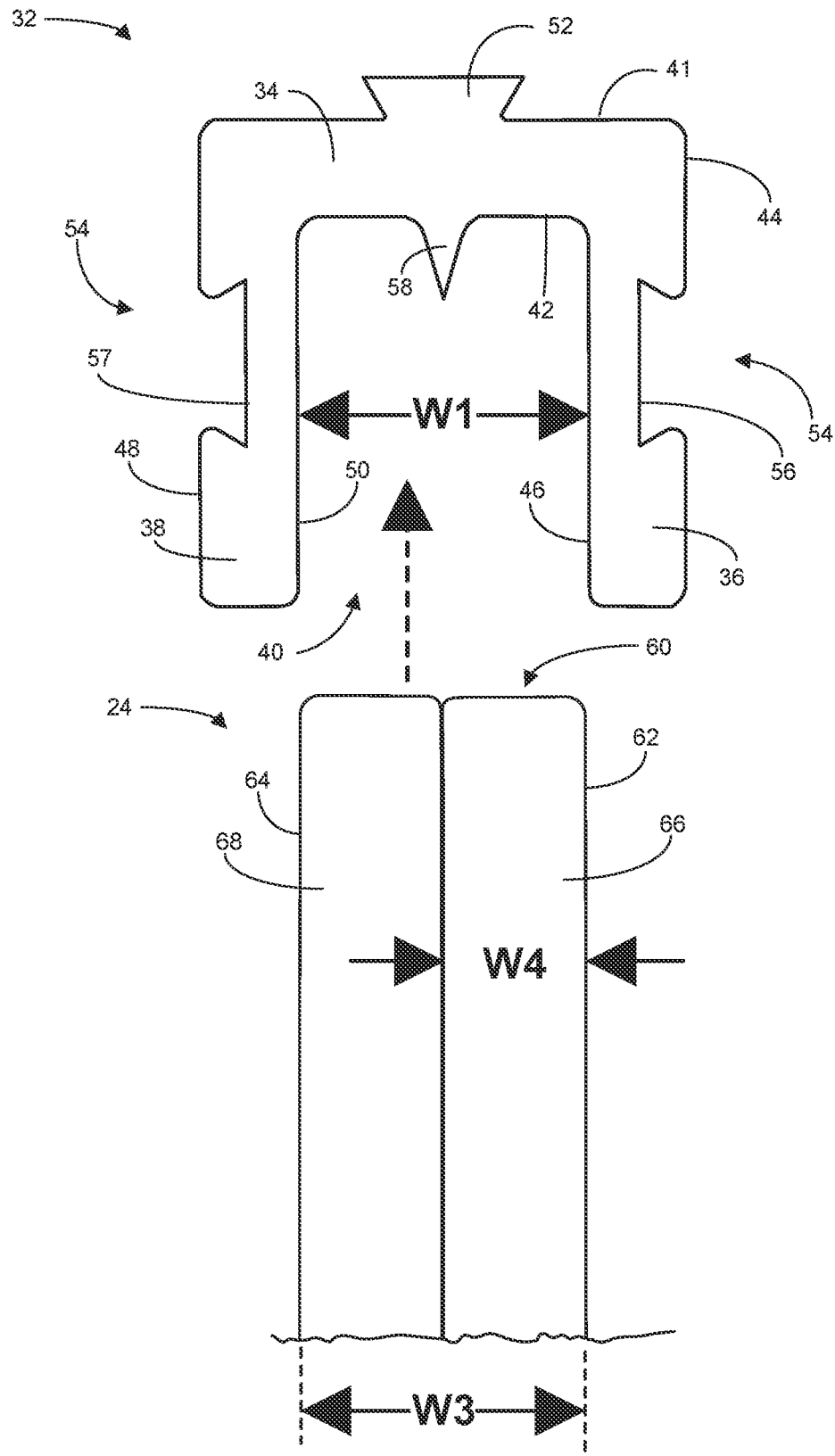
FIG. 7 is a top plan view of the fastener of FIG. 3 adjacent an edge of a panel member according to one aspect of the present disclosure.

The panel assembly 22, in at least some embodiments, includes a panel member 24 (see also, FIG. 7). Panel member 24 is a substantially flat planar rectilinear member. In at least some embodiments, panel member 24 is formed of a pressed and rigid fabric material that retains its shape once constructed without the need for any internal frame members. For instance, in at least some cases panel member 24 will be formed from virgin and/or recycled pressed polyethylene terephthalate (PET) or some other rigid polyester based fabric type material. In other embodiments, the panel may be formed of an alternative woven fabric material. According to some embodiments, panel member 24 can be formed from a pressed fiber material. As will be described herein, the panel member 24 can be resiliently compressible such that it may deform when compressed, and return at least substantially to its original shape when no longer compressed.

In an advantageous embodiment panel member 24 has a thickness within a range between 3 and 15 millimeters. In particularly advantageous embodiments panel member 24 has a thickness that is between 8 and 12 millimeters. Other variations or embodiments of the dimensions of the panel member 24 are envisioned herein. While panel member 24 may be formed of a single homogenous PET fabric layer in some embodiments, in other embodiments panel member 24 may be constructed of two or more thinner layers that are adhered or otherwise secured (e.g., mechanically) together (see FIG. 7) to form a laminated structure. An exemplary panel assembly that is particularly advantageous for use with the fasteners described in this disclosure is described in greater detail in U.S. provisional patent application Ser. No. 17/109,996 which is titled "Privacy Barrier With Window" and which was filed on Dec. 2, 2020, which is incorporated herein by reference in its entirety. Thus, embodiments are contemplated herein that would include any of the panel constructs from that application secured together using any of the fasteners described in this specification.

The height and width dimensions of panel member 24 depend on how the barrier assembly that is constructed using panel member 24 is to be employed. For instance, if the panel assembly 22 is used to provide a privacy panel that only extends above a workstation tabletop, the height dimension of panel member 24 may be within a range between 400 millimeters and 1000 millimeters and in particularly advantageous embodiments the height may be between 580 and 630 millimeters so that an upper edge of the panel assembly is between 580 and 630 millimeters above the top surface of the tabletop. If the panel assembly 22 is to provide both privacy and modesty (e.g., extending under a tabletop) barriers, the height dimension may be within a range between 600 and 1200 millimeters and in particularly advantageous embodiments may be within a range between 800 and 1000 millimeters where, as shown in FIGS. 1 and 2, the panel assembly 22 is mounted adjacent a workstation worksurface 12 so that about two thirds of the panel assembly 22 extends above the tabletop member and about one third of the panel assembly 22 extends below the worksurface 12.

In most cases workstation panel assemblies 22 will be designed to have width dimensions that extend the lengths of an adjacent edge of a worksurface 12. To this end, see again FIG. 1, where panel assembly 22 extends the entire length of the rear edge 18 of worksurface 12 while other panel assemblies 24 and 26 extend the entire lengths of lateral edges 15 and 17, respectively. In other embodiments it is contemplated that panel assemblies may be floor supported and, in that case, may be constructed with greater heights. For instance, in some cases a floor supported panel assembly may have a height dimension within a range between 1500 millimeters (e.g., 5 feet) and 2400 millimeters (e.g., 8 feet).

Figure 2:
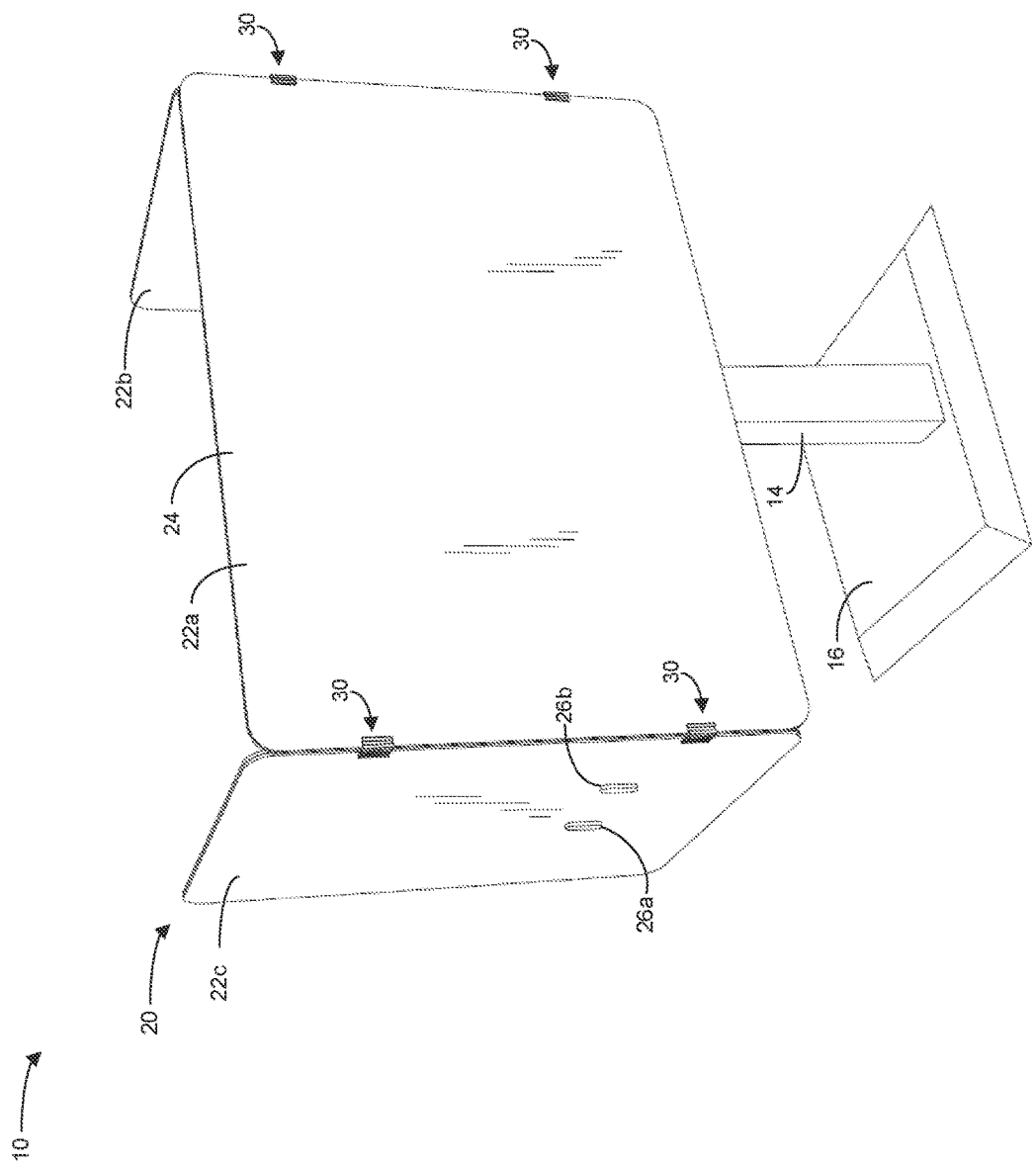
FIG. 2 is a rear perspective view of the workstation of FIG. 1.

Referring still to FIGS. 1 and 2, the panel member 24 can be rounded at corners of the rectangular shape. The rounded or curved corners can, in at least some cases, define a radius of curvature that is within a range between 25 and 50 millimeters and in particularly advantageous cases the range is between 35 and 40 millimeters. By having a circumferential edge with rounded corners, the rectangular-shaped panel member 24 can result in a particularly attractive panel assembly 22.

Panel members can also form mounting openings 26a and 26b (illustrated on panel assembly 22c) configured to provide a mounting provision to mount the panel members to a portion of the workstation, in this case, the worksurface 12. In the illustrated embodiment, openings 26a, 26b extend through the panel member. Each opening 26a, 26b can be between 8 and 15 millimeters wide and between 40 and 110 millimeters high. The openings can be spaced apart along the width dimension of the panel assembly and, in embodiments where the panel assembly operates as both a privacy panel and a modesty panel, can be approximately one third the height of the panel assembly from a bottom edge of the panel member.

As previously noted above, one or more fastener assemblies 30 can be utilized to couple one or more adjacent panel assemblies 22. In the illustrated embodiment, two fastener assemblies 30 are utilized to couple two adjacent panel assemblies 22 (e.g., panel assembly 22a and 22b, and 22a and 22c), although it is also contemplated that more or less than two fastener assemblies can be utilized. For example, a plurality of fastener assemblies can be arranged along an intersection between two panel assemblies. In the illustrated embodiment, the fastener assemblies 30 can be separated from each other along the corner of the two abutting panel assemblies 22.

Figure 3:
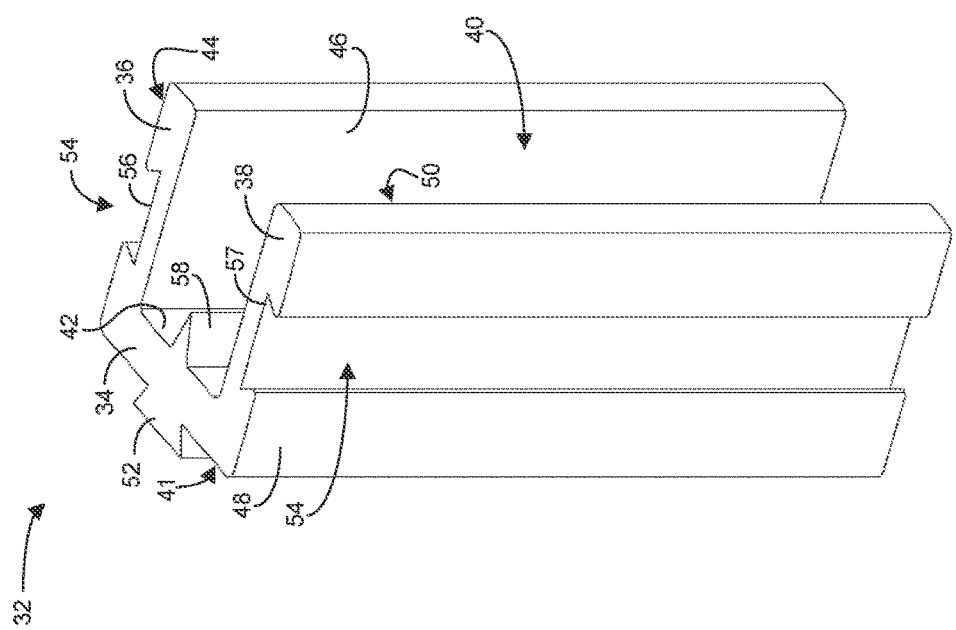
FIG. 3 is a first perspective view of a first exemplary fastener that is consistent with at least some aspects of the present disclosure.
Figure 4:
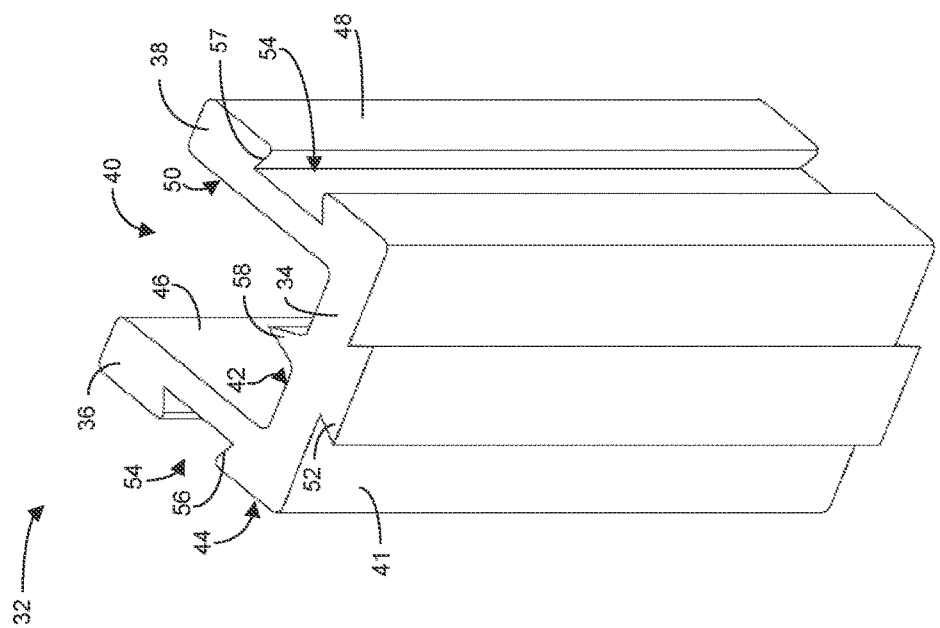
FIG. 4 is a second perspective view of the fastener of FIG. 3.

As will be described herein, each fastener assembly 30 can include one or more fasteners (i.e., connectors, clips, etc.). Referring now to FIGS. 3 and 4, one embodiment of a fastener 32 is illustrated. The fastener 32 can include a base wall 34, a first sidewall 36, and a second sidewall 38. The first and second sidewalls 36, 38 extend from the base wall 34, thereby forming a channel 40. In the illustrated embodiment, the first and second sidewalls 36, 38 are parallel to each other. In a particularly preferred embodiment, the first and second sidewalls 36, 38 are perpendicular to the base wall 34.

The base wall 34 can form an outer surface 41 and an internal or floor surface 42 opposite the outer surface 41. The first sidewall 36 can include a first external surface 44 and a first internally facing surface 46 opposite the first external surface 44. Similarly, the second sidewall 38 can include a second external surface 48 and a second internally facing surface 50 opposite the first external surface 44. In the illustrated embodiment, the first external surface 44 and the second external surface 48 are parallel surfaces, and similarly, the first facing internal surface 46 and the second facing internal surface 50 are parallel. The floor surface 42, first facing internal surface 46 and second facing internal surface 50 can together define the channel 40. In the illustrated embodiment, the channel 40 is a U-shaped channel with a flat or planar base floor surface 42.

The fastener 32 includes at least one protrusion 52 and at least one opening 54, the protrusion 52 being configured for coupling with an opening. That is, the opening 54 can be complementarily shaped to the at least one coupling protrusion 52 such that a coupling protrusion of a second fastener can be received into the opening of the first fastener. The complementary shape of the opening 54 relative to the protrusion 52 allows for the protrusion of a second fastener to slide along the opening 54 of a first fastener, or vice versa. The opening and the coupling protrusion can be arranged on any one of the external or outwardly facing surfaces, such as outer surface 41, or first and second external surfaces 44, 48.

Figure 15:
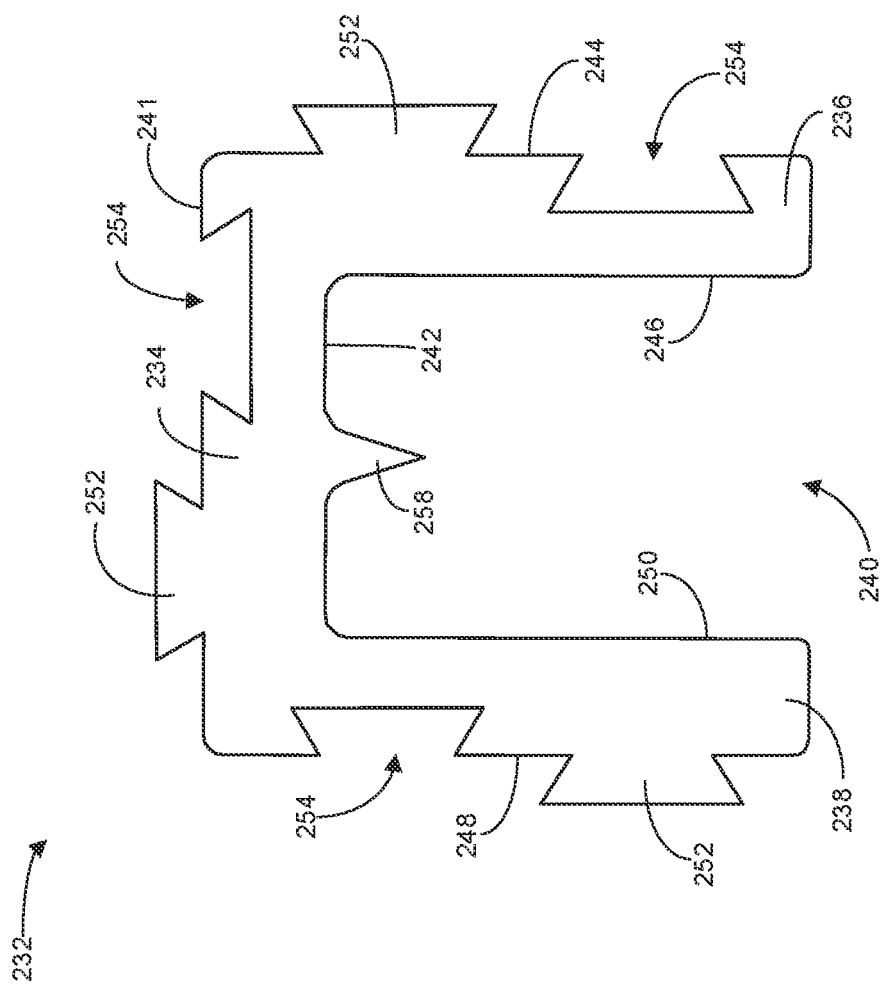
FIG. 15 is a top view of a third fastener type that is consistent with at least some aspects of the present disclosure.

According to some embodiments, a coupling protrusion and an opening can be arranged on the same external surface (e.g., FIG. 15). In FIGS. 3 and 4, the opening 54 and the coupling protrusion 52 are arranged on different external surfaces. In a particularly preferred embodiment, the opening 54 and the coupling protrusion 52 can be arranged on different, yet directly adjacent surfaces. In the FIGS. 3 and 4 embodiment, the opening 54 and the coupling protrusion 52 are arranged on directly adjacent surfaces that together form a ninety degree angle.

In the FIGS. 3 and 4 embodiment, the coupling protrusion 52 is arranged on and extends from the outer surface 41 of base wall 34. The coupling protrusion 52 can define a trapezoidal cross section (e.g., profile). In the illustrated embodiment, the coupling protrusion 52 defines an inverted trapezoidal cross section, with respect to the outer surface 41 being the "base" of the inverted trapezoid. The coupling protrusion 52 can extend along at least a portion of the length of the fastener 32. In the illustrated embodiment, the coupling protrusion 52 extends along the entire length of the fastener 32 (i.e., along the entire length dimension of the outer surface 41 of the base wall 34).

In the FIGS. 3 and 4 embodiment, the opening 54 is configured as a slot. The slot can be arranged on each of the first external surface 44 and the opposing second external surface 48. That is, a first slot 56 can be formed on the first external surface 44 and a second slot 57 can be formed on the second external surface 48. The slots 56, 57 can define a profile that is complementarily shaped to the cross section of the coupling protrusion 52. That is, the slot 56 can define a profile that has an inverse shape to that of the coupling protrusion 52. In the illustrated embodiment, the slots 56, 57 defines a trapezoidal profile configured to receive the trapezoidal cross section of the coupling protrusion 52. The slots 56, 57 can extend along at least a portion of the length of the fastener 32. In the illustrated embodiment, the slots 56, 57 extends along the entire length of the fastener 32 (i.e., along the entire length dimension of the first and second external surfaces 44, 48 of the first and second sidewalls 36, 38, respectively).

Referring still to FIGS. 3 and 4, the fastener 32 can include a channel protrusion 58. In the illustrated embodiment, the channel protrusion 58 extends outward from the floor surface 42 of the base wall 34 into the channel 40. That is, the channel protrusion 58 extends into the channel 40 along a trajectory that is substantially parallel to the first and second facing internal surfaces 46, 50. As will be described herein, the channel protrusion 58 can engage an edge of a panel member to aid in securing the fastener 32 to the panel member. In the illustrated embodiment, the channel protrusion 58 defines a triangular cross section or profile. The channel protrusion 58 can extend along at least a portion of the length of the fastener 32. In the illustrated embodiment, the channel protrusion 58 extends along the entire length of the fastener 32 (i.e., along the entire length dimension of the floor surface 42 of the base wall 34).

As illustrated in FIGS. 3 and 4, the fastener 32 can define a uniform cross section throughout the entire length of the fastener 32. According to some embodiments, the uniform cross section is formed via an extrusion process. That is, the fastener 32 can be extruded (i.e., through an extrusion die of similar shape) to any length, and then be trimmed or cut up into multiple lengths to form multiple of the same fasteners. The fastener 32 can be formed out of plastic or some other rigid or semi-rigid material.

Figure 5:
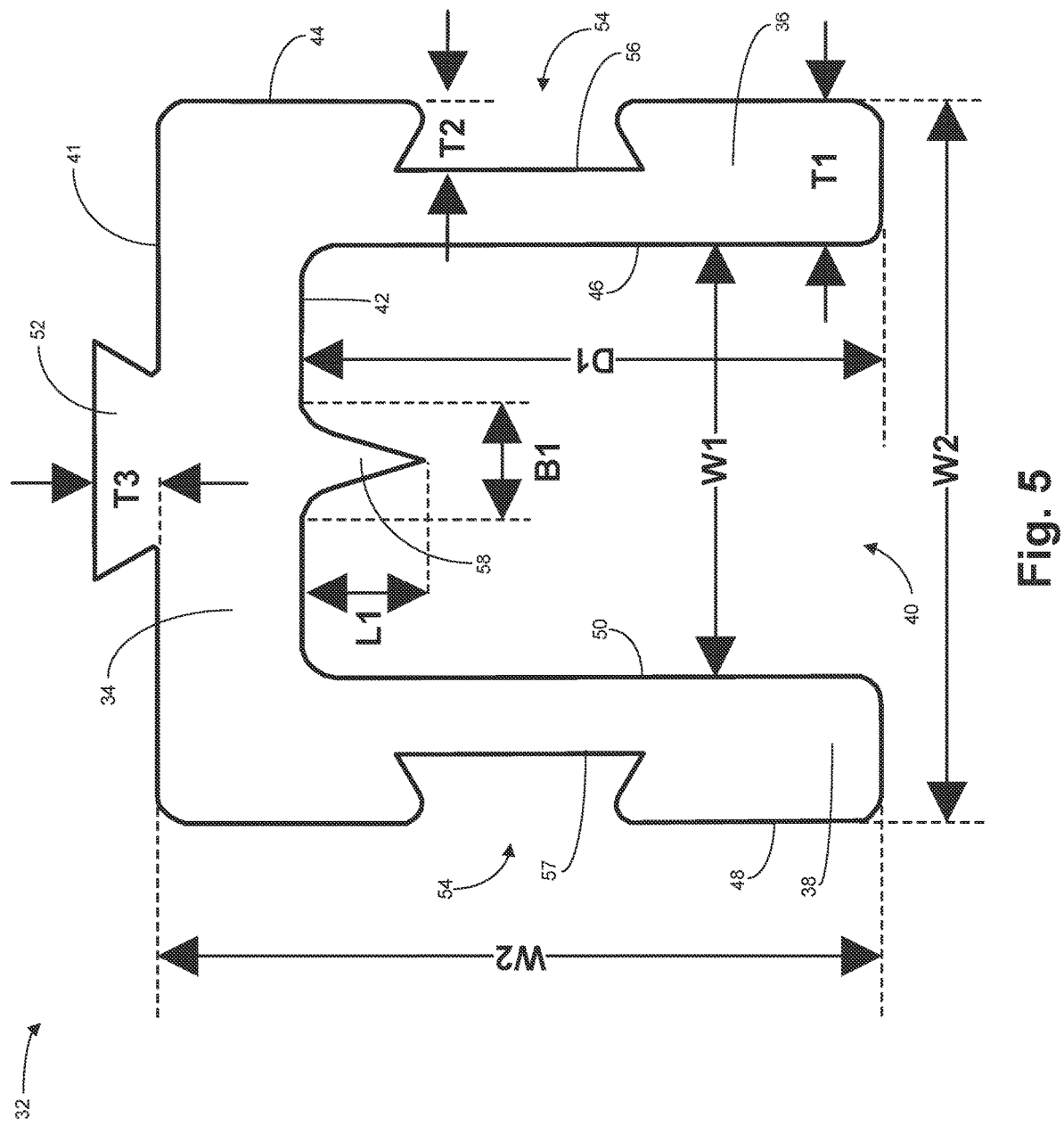
FIG. 5 is a cross sectional view of the fastener of FIG. 3.
Figure 6:
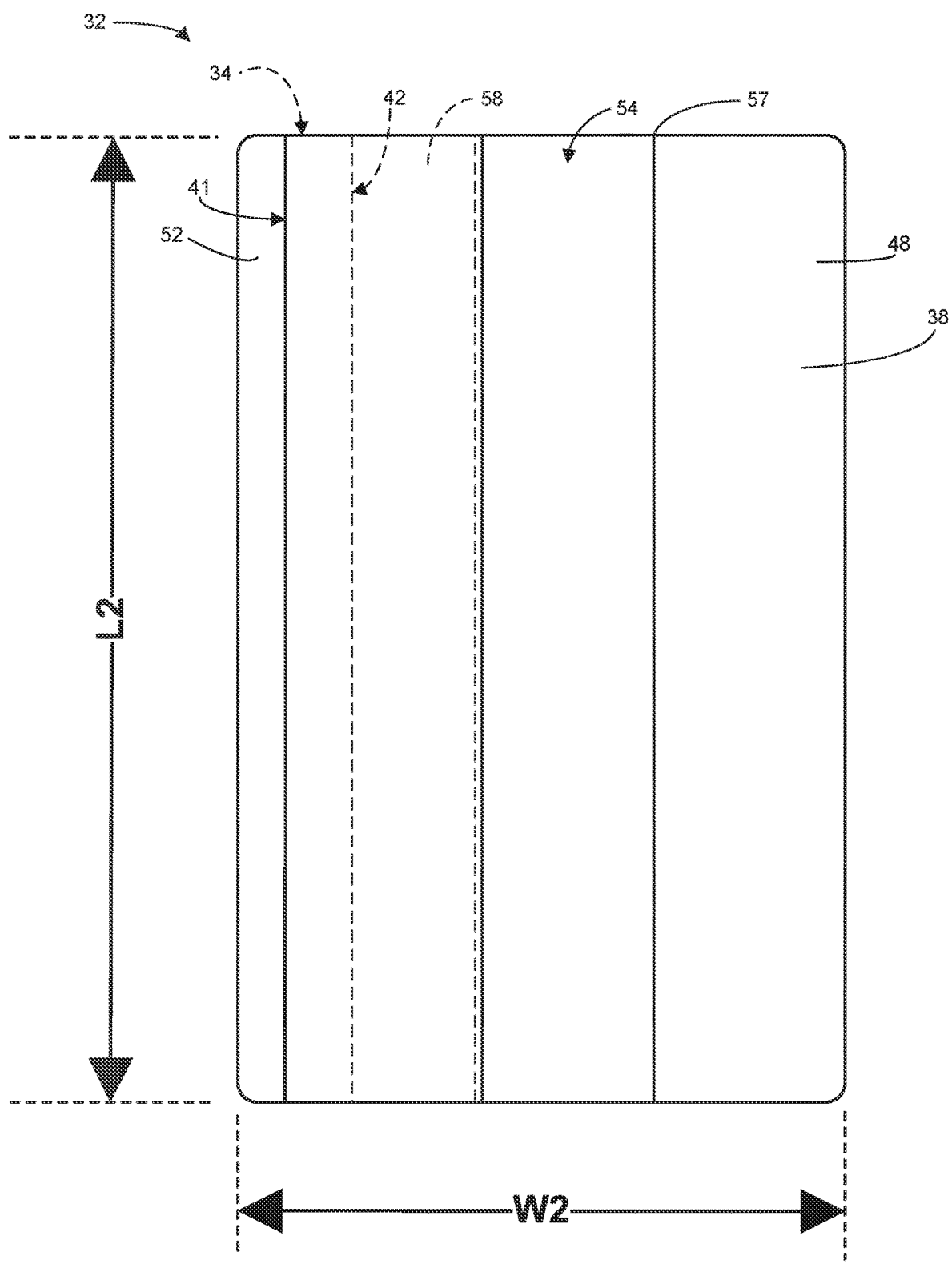
FIG. 6 is a side profile view of the fastener of FIG. 3.

Referring now to FIGS. 5 and 6, the various dimensions of the fastener 32 can have many different dimensional values. Nevertheless, there are dimensions that are preferable in some applications. For example, the dimensions discussed below can be selected based on, or relative to, a thickness of a panel member to be received within the channel 40. This thickness can aid in determining the other dimensions of the fastener 32. For example, a panel member can have a thickness within a range between 3 and 30 millimeters. Correspondingly, the channel width dimension $W1$ can define a substantially similar dimension as the thickness of the panel member. For example, the channel width $W1$ can be within a range between 3 and 30 millimeters or, in some cases, slightly less than the thickness of the panel member. According to a particularly advantageous embodiment, the channel width $W1$ can be within a range between 8 and 12 millimeters.

The channel 40 can define a depth dimension $D1$ that can be dependent upon a desired engagement between the base wall 34 and sidewalls 36, 38 and a panel member. For example, the channel depth $D1$ can be within a range between 5 and 30 millimeters. According to a particularly advantageous embodiment, the channel depth $D1$ can be within a range between 12 and 20 millimeters.

The base wall 34 can define a width dimension $W2$. The base wall width $W2$ can be within a range between 10 and 30 millimeters. According to a particularly advantageous embodiment, the base wall width $W2$ can be within a range between 15 and 25 millimeters. As best illustrated in FIG. 5, the first and second sidewalls 36, 38 can define a width dimension that is substantially similar to the base wall width dimension $W2$. In the illustrated embodiment, the first and second sidewalls 36, 38 can define a width dimension that is the same as the base wall width dimension $W2$.

As previously noted, the dimensions can be relative to a panel member thickness. For example, base wall width $W2$ can be about 140% to about 260% of the thickness of a panel member. Said another way, the channel width $W1$ can be between about 30% to about 80% of the base wall width $W2$. According to a particularly advantageous embodiment, the channel width $W1$ can be between about 50% to about 60% of the base wall width $W2$.

The first and second sidewalls 36, 38 can define a thickness dimension $T1$. The sidewall thickness $T1$ can be within a range between 2 and 8 millimeters. According to a particularly advantageous embodiment, the sidewall thickness $T1$ can be within a range between 3.5 and 5.5 millimeters. As best illustrated in FIG. 5, the base wall 34 can define a thickness dimension that is substantially similar to the sidewall thickness dimension $T1$. In the illustrated embodiment, the base wall 34 can define a thickness dimension that is the same as the sidewall thickness dimension $T1$.

The first and second slots 56, 57 can define a thickness dimension $T2$ defining the depth at which the slots extend into the sidewalls 36, 38. The slot thickness $T2$ can be within a range between 1 and 4 millimeters. According to a particularly advantageous embodiment, the slot thickness $T2$ can be within a range between 1.5 and 3 millimeters. As best illustrated in FIG. 5, the coupling protrusion can define a thickness dimension $T3$ that is substantially similar to the slot thickness dimension $T2$. In the illustrated embodiment, the coupling protrusion thickness $T3$ can be 5% to 15% less thick compared to the slot thickness dimension $T2$. The reduction in protrusion thickness $T3$ relative to the slot thickness $T2$ can provide a slip fit between the coupling protrusion 52 and an opening on a second fastener when a first and second fastener are coupled together. That is, the reduction in protrusion thickness $T3$ relative to the slot thickness $T2$ can enable the coupling protrusion 52 to more readily slide in, or to allow a particular amount of friction between, the coupling protrusion and a slot or opening.

The channel protrusion 58 can define a base width dimension $B1$ and a length or height dimension $L1$, the base dimension $B1$ being the general dimension at the proximal end of the channel protrusion where the channel protrusion meets the floor surface 42 of the base wall 34 and the length dimension L1 being the amount the channel protrusion 58 extends into the channel 40 from the floor surface 42. The length dimension L1 can be within a range between 2 and 20 millimeters. According to a particularly advantageous embodiment, the length dimension L1 can be within a range between 2.5 and 13 millimeters (i.e., between 0.1 and 0.5 inches). The base dimension B1 can be within a range between 1 and 5 millimeters. According to a particularly advantageous embodiment, the base dimension B1 can be within a range between 1 and 3 millimeters.

The first and second sidewalls 36, 38 can define a length dimension L2. It is to be understood by one of ordinary skill in the art that, in the view depicted, the first sidewall 36 is hidden from view by the second sidewall 36. The wall length L2 can be within a range between 20 and 100 millimeters. According to a particularly advantageous embodiment, the wall length L2 can be within a range between 25 and 50 millimeters. As best illustrated in FIG. 6, the base wall 34 can define a length dimension that is substantially similar to the wall length dimension L2. In the illustrated embodiment, the base wall 34 can define a length dimension that is the same as the wall length dimension L2. As made clear by FIG. 6 (supplemented by FIGS. 3 and 4), in the illustrated embodiment, the slots 56, 57, the coupling protrusion 52, and the channel protrusion 58 (shown in dashed lines) run or extend along the entire length of the fastener 32. In some cases the length dimension L2 may be identical to the length of an edge of a panel that the fastener is to be attached.

Referring now to FIG. 7, the fastener 32 is illustrated adjacent to panel member 24 in preparation for insertion of the panel member 24 into the channel 40. The panel member 24 can form an edge 60 between first and second flat and oppositely facing and substantially parallel surfaces 62 and 64. The panel member 24 can have a width or thickness dimension W3 within a range between 3 and 15 millimeters. According to a particularly advantageous embodiment, the panel member thickness W3 can be within a range between 8 and 12 millimeters. According to some embodiments, the thickness W3 of the panel member 24 can be substantially similar to the channel width W1 of the channel 40. In some cases, it may be advantageous to provide a press fit between the channel 40 and the panel member 24. In such cases, the panel member thickness W3 can be between 0.02 and 0.1 inches thicker than the channel width W1, thereby providing a snug or friction fit between the panel member 24 and the channel 40.

The panel member 24 can be formed from one or more layers. In the illustrated embodiment, the panel is formed from a first layer 66 and a second layer 68. The panel layers 66, 68 can define a thickness dimension W4 within a range between 2 and 10 millimeters. According to a particularly advantageous embodiment, the panel layer thickness W4 can be within a range between 2 and 7.5 millimeters. According to the illustrated embodiment, the first panel layer 66 and the second panel layer 68 have the same thickness. For instance, in some cases a 7 millimeter panel member 24 may be constructed by adhering two 3.5 millimeter panel layers together in a laminated fashion.

According to other embodiments, the panel layers 66, 68 can have different thicknesses. For example, in some cases it may be preferred for first panel layer 66 to be less thick than second panel layer 68. In other cases it may be preferred that first panel layer 66 to be thicker than second panel layer 68. In still other cases it may be that one panel layer be relatively thicker than the other panel layer to adjust the stiffness properties of the panel member.

Figure 8:
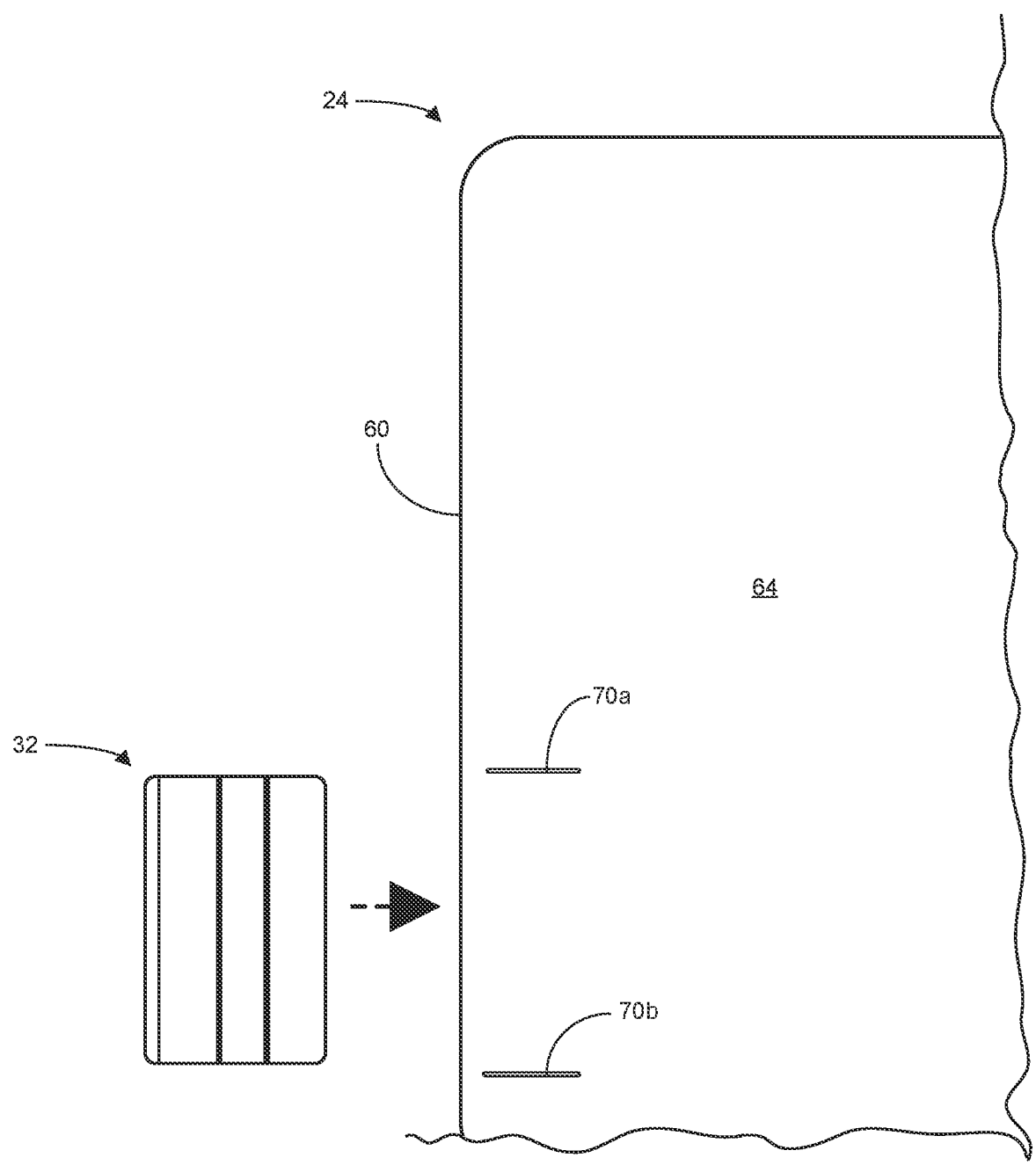
FIG. 8 is a side view of an edge of a panel member with a fastener ready to be installed thereon.
Figure 9:
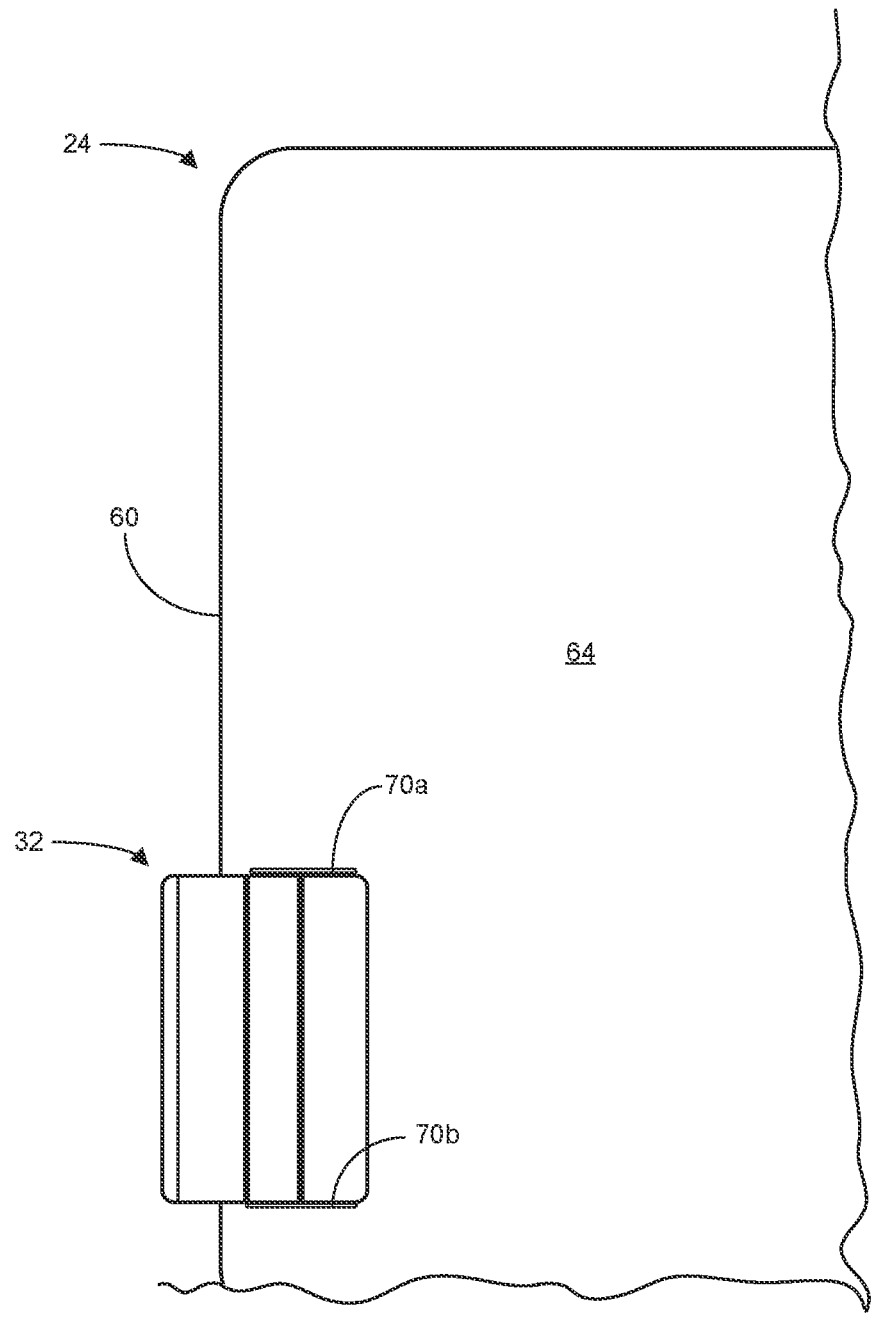
FIG. 9 a side view of the panel member of FIG. 8 with the fastener installed.

Referring now to FIGS. 8 and 9, the process of inserting the fastener 32 onto the panel member 24 is illustrated. The fastener 32 can be inserted from the side of the panel member 24 until the edge 60 of the panel member 24 is fully seated or engaged with the floor surface of the channel 40 (see, e.g., FIG. 10). In the illustrated embodiment, the surfaces 62, 64 can include alignment markings 70a, 70b (e.g., ink indicia, an indentation, etc.) configured to aid a user in aligning the fastener 32 at a particular and advantageous location along the panel edge 60.

Figure 10:
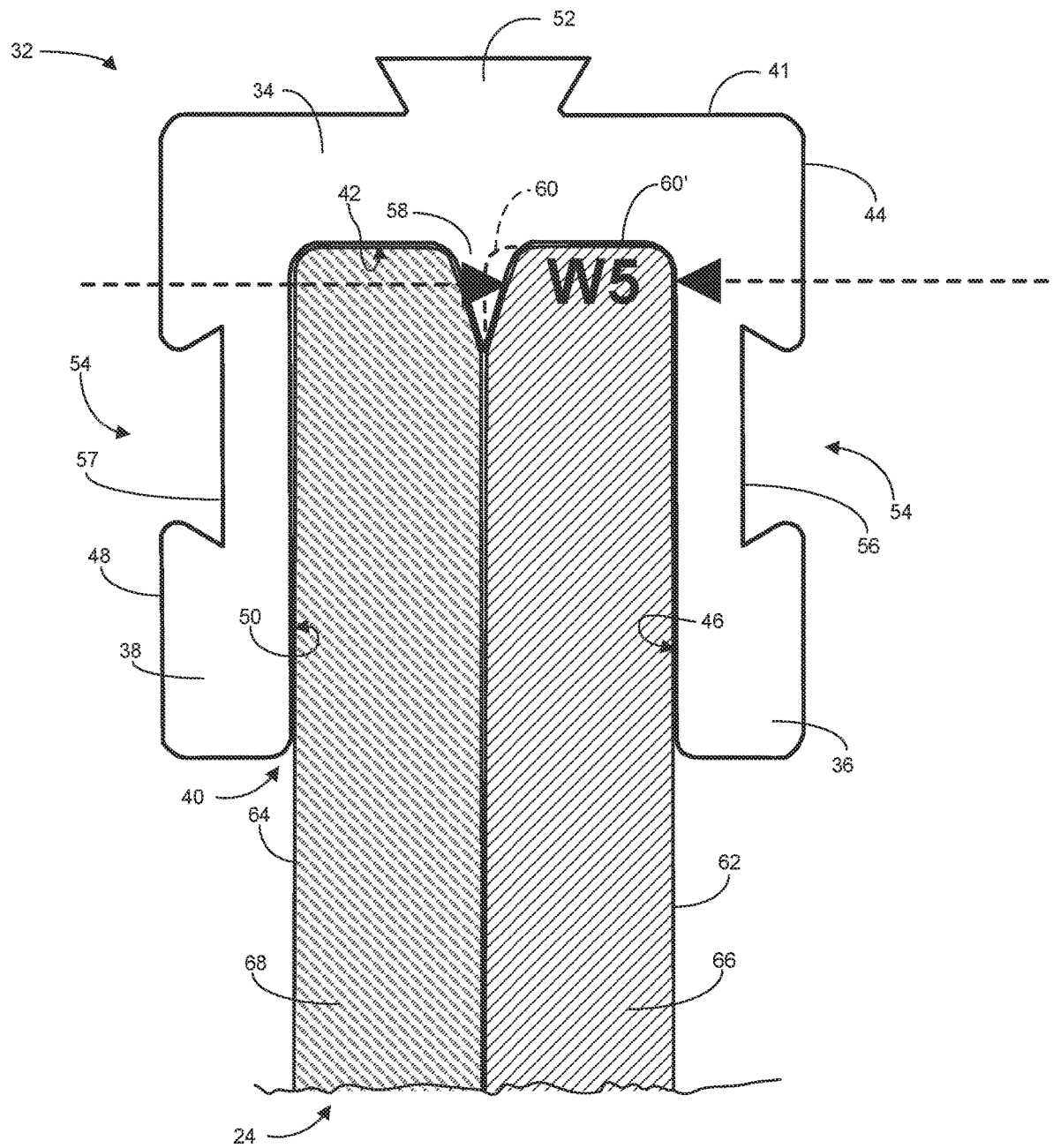
FIG. 10 is a cross-sectional view of a fastener installed on an edge of a panel member.

As illustrated in FIG. 10, as the panel edge 60 is inserted into the channel 40, a distal end of the channel protrusion 58 can engage or bite the panel edge 60 of the panel member 24. At the same time, the first and second panel surfaces 62, 64 can be in engagement with, respectively, the first and second facing internal surfaces of the first and second sidewalls 36, 38. In the illustrated embodiment, the channel protrusion 58 is in alignment with the division between the first and second panel layers 66, 68. When fully seating within the channel 40, the edge 60 of the panel member 24 can be deformed at a portion adjacent to the channel protrusion 58. Note the panel deformation shown by the original profile at 60 and the deformed profile at 60'. The deformation of the edge can reduce a thickness of an individual panel layer (e.g., layers 66, 68) local to the edge 60 of the panel member 24, dimensionally shown as W5. According to some embodiments, the layers of the panel, when engaged with the channel protrusion, can define a width W5 that is between 5 and 25% less than the un-deformed panel layer width W4 (see FIG. 7).

Figure 11:
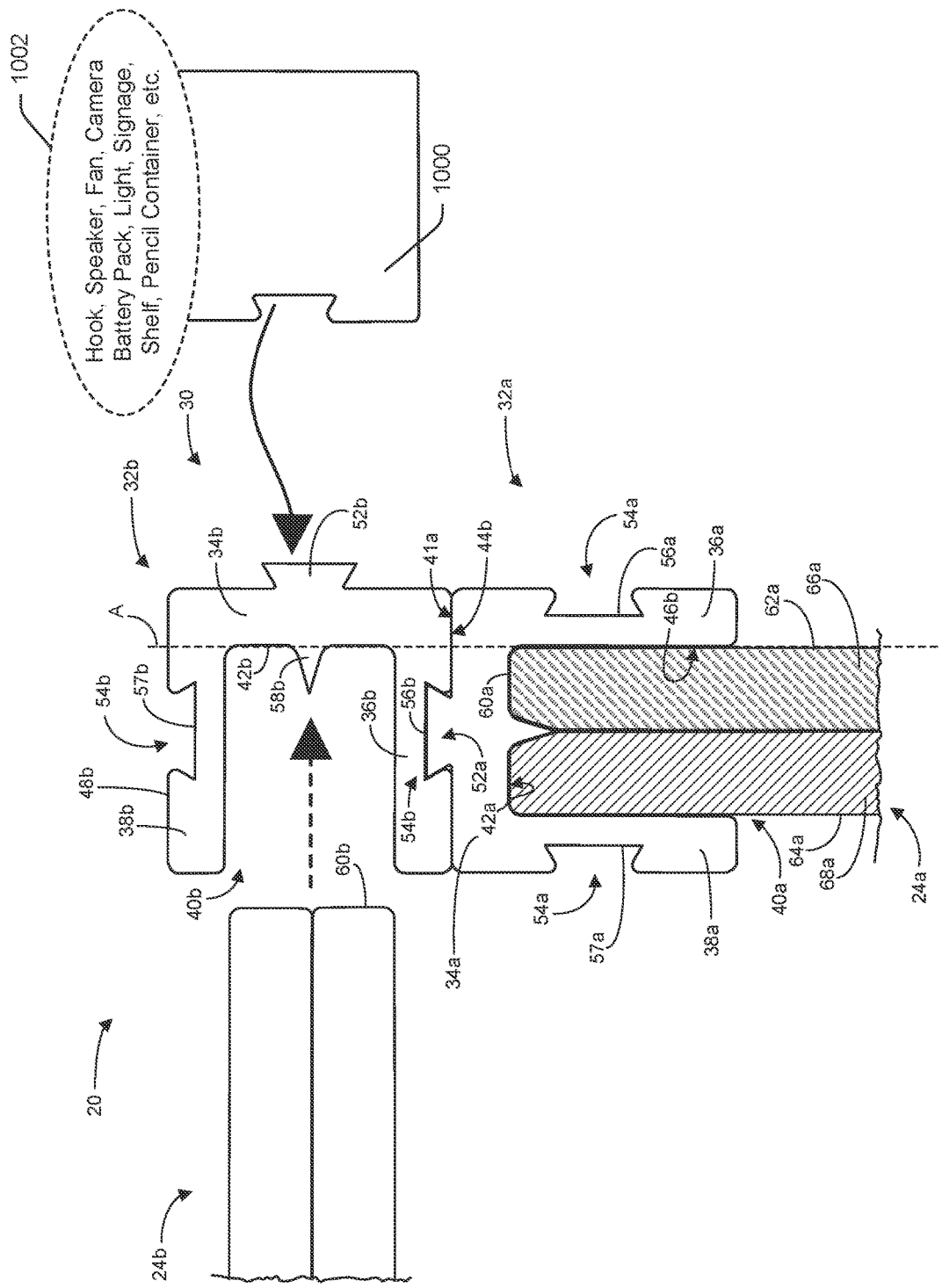
FIG. 11 is a top view of an exemplary configuration of a panel assembly coupled together with modular fasteners where one panel is shown in cross section.

FIG. 11 illustrates a panel assembly 20 including multiple panel members 24a, 24b secured together by a fastener assembly 30 including multiple fasteners 32a, 32b. As illustrated, the modularity of the fasteners 32 can allow a plurality of the same fasteners 32 to be combined into a particular configuration of a fastener assembly 30 by coupling fasteners together at various orientations. In the illustrated embodiment, the coupling protrusion 52a of a first fastener 32a can be inserted or received within an opening 54b of a second fastener 32b (e.g., within the slot 56b). When coupled, the outer surface 41a of the base wall 34a on the first fastener 32a is directly adjacent to one of the first or second external surfaces 44b, 48b on the second fastener 32b. In the illustrated embodiment, the outer surface 41a on the first fastener 32a is directly adjacent to the first external surface 44b on the second fastener 32b. When coupled, the base wall 34a of the first fastener 32a is in alignment with the first sidewall 36b of the second fastener 32b such that the respective edges appear flush. As illustrated by dashed line A, when the panel assembly 20 is in an assembled configuration, the fastener assembly 30 is configured such that a surface of a panel aligns with an edge of an adjacent panel. In the illustrated embodiment, the first surface 62a of the first panel member 24a is in alignment with the edge 60b of the second panel member 24b. Thus, for example, a more attractive appearance can be presented.

A generic process of assembling a panel assembly 20 will now be described with reference to FIG. 11. Although FIG. 11 only illustrates one exemplary configuration of panels and fasteners, one of ordinary skill in the art will recognize that a substantially similar process could be used or repeated to form various other configurations, some of which will be shown in greater detail herein. To form a panel assembly 20 utilizing a fastener assembly 30, a first panel member 24a can be inserted into the channel 40a of the first fastener 32a until the edge 60a of the first panel member 24a abuts the floor surface 42a of the base wall 34a on the first fastener 32a. A second fastener 32b can then be coupled to the first fastener 32a by engaging the coupling protrusion 52a or opening 54a on the first fastener 32a with the coupling protrusion 52b or opening 54b on the second fastener 32b. In the illustrated embodiment, the second fastener 32b is secured to the first fastener 32a at the opening 54b arranged on the first sidewall 36b of the second fastener 32b. Once the fasteners 32a, 32b are secured to each other, the second panel member 24b is inserted into the channel 40b of the second fastener 32b until the edge 60b of the second panel member 24b abuts the floor surface 42b of the base wall 34b on the second fastener 32b. The first panel member 24a is therefore secured to the second panel member 24b via a coupling between the first fastener 32a and the second fastener 32b.

Figure 12:
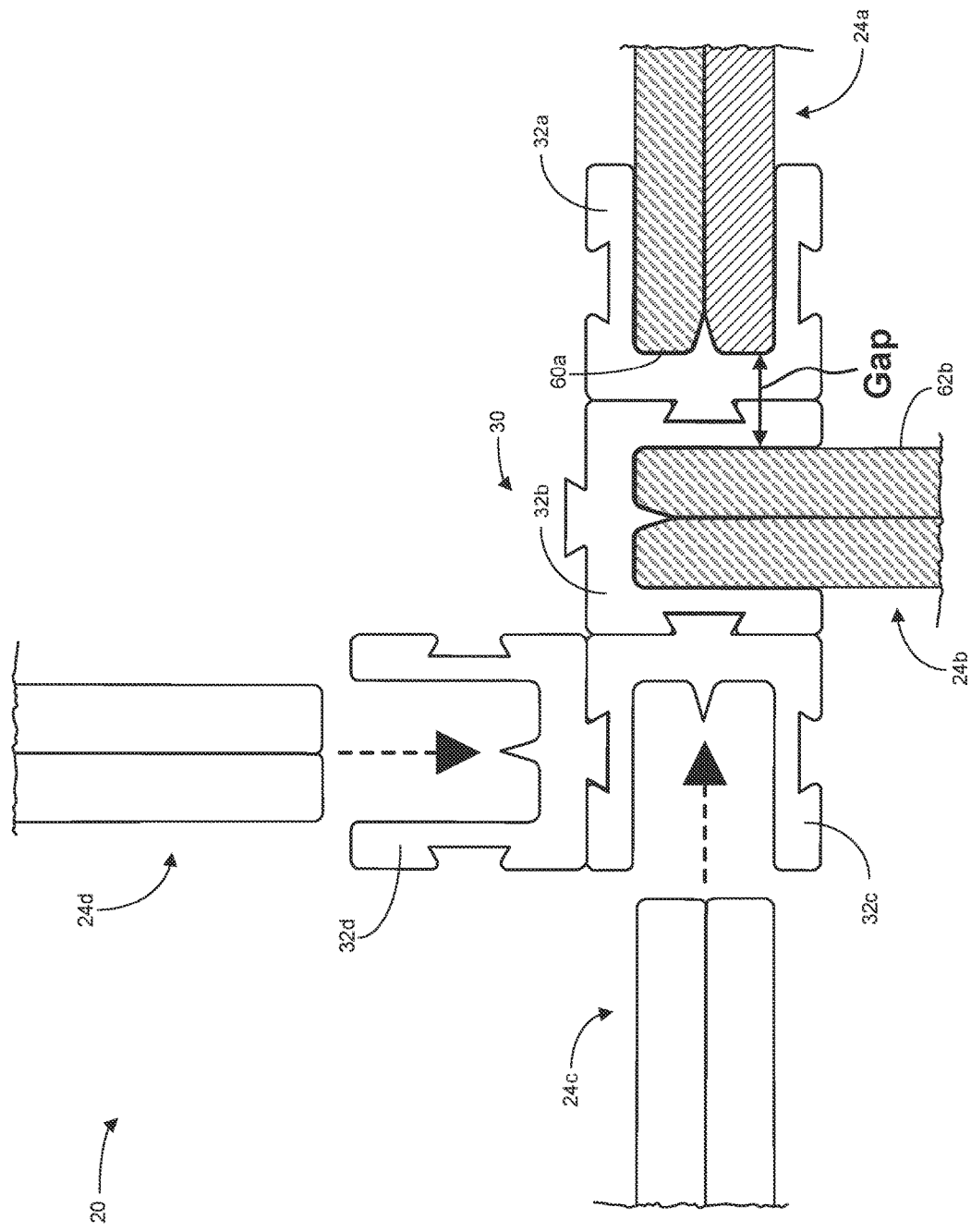
FIG. 12 is a top view of an exemplary X-shaped configuration of a fastener assembly comprising a plurality of modular fasteners.

According to other exemplary processes, the second fastener 32b may first be coupled with the second panel member 24b prior to coupling the first and second fasteners 32a, 32b together. As will be understood, the above process can be repeated depending on the number of fasteners in the fastener assembly, or the number of panels in the panel assembly, etc. For example, FIG. 12 illustrates another exemplary configuration of a panel assembly 20 including a plurality of modular fasteners 32a-32d arranged at different orthogonal orientations to provide an L-shaped fastener assembly 30 for coupling a plurality of panel members 24a-24d together. In the illustrated embodiment, a gap can be formed between the edge 60a of a first panel member 24a and a surface 62b of a second panel member 24b. It is to be understood that, when assembled, this gap also exists between other adjacent panel members (e.g., 24c, 24d).

As illustrated in FIG. 12, every fastener 32 is orthogonal to a directly adjacent fastener (e.g., in contact), which results in every panel member 24 being orthogonal to a directly adjacent panel member. In some cases, it may be desired to provide a fastener that can allow for directly adjacent panel members to be arranged coplanar.

Figure 13:
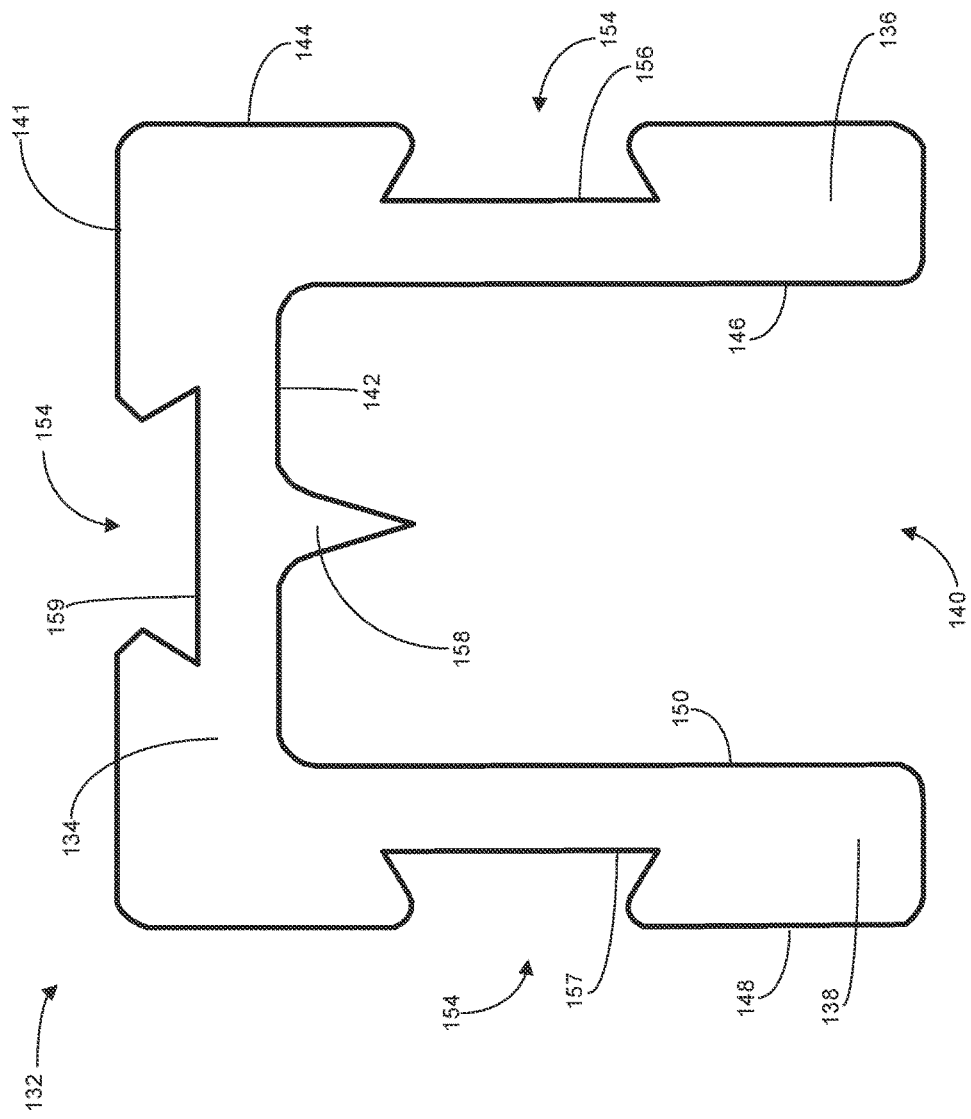
FIG. 13 is a top view of a second exemplary fastener that is consistent with at least some aspects of the present disclosure.

FIG. 13 illustrates a fastener 132 configured to provide a coplanar panel assembly 120 when combined with the fastener 32 of FIGS. 3-12. It is to be understood that like elements will be labeled using like reference numerals, with the exception that the numerals will be listed in the 100's (e.g., fastener 32 and fastener 132). Unless shown or described otherwise, it is to be understood that elements sharing like reference numerals are substantially similar to those previously described herein. In the illustrated embodiment, the fastener 132 can be substantially similar to the fastener 32 of FIG. 3, with the exception that the base wall 134 of fastener 132 includes a third opening 154 as opposed to a coupling protrusion. The third opening 154 can be configured as a slot 159. In the illustrated embodiment, the third slot 159 is substantially similar in both function and dimension as the first and second slots 156, 157.

Figure 14:
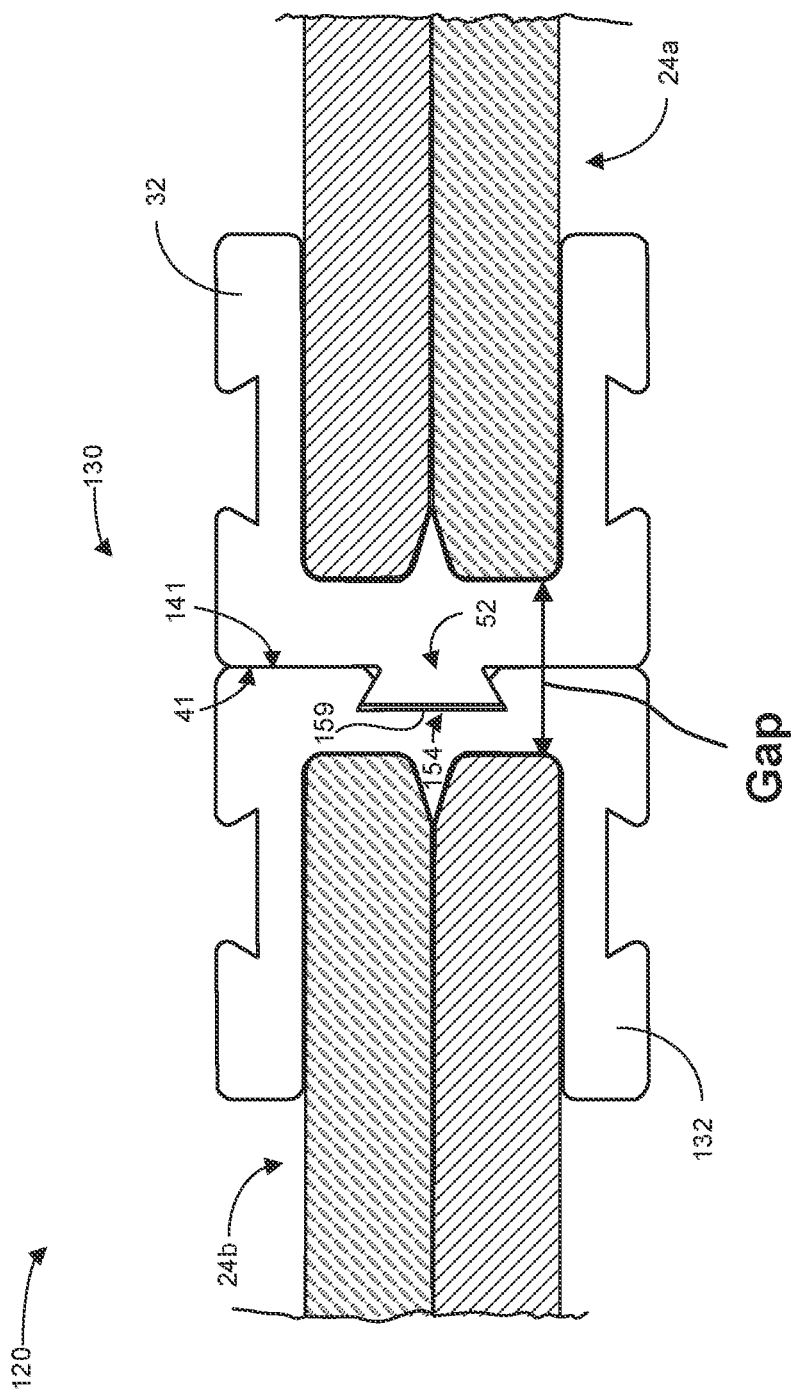
FIG. 14 is a top view of a coplanar panel arrangement including one fastener like the one shown in FIG. 13 and one fastener like the one shown in FIG. 3 where the panels are shown in cross section.

As illustrated in FIG. 14, the fastener 132 can be combined with the fastener 32 of FIG. 3 to provide a coplanar panel arrangement. In the illustrated embodiment, the outer surface 41 of the fastener 32 is directly adjacent to the outer surface 141 of the fastener 132. In that way, the third opening 154 (e.g., the slot 159) of fastener 132 can be in engagement with the coupling protrusion 52 of the fastener 32. In the illustrated embodiment, a gap is formed between the edges 60a, 60b of the panel members 24a, 24b. The gap width can be substantially similar to the gap formed in FIG. 12, owing to the uniform dimensionality of the base walls and sidewalls of the fasteners 32, 132.

Referring to FIG. 15, the coupling protrusion 252 and the opening 254 can be arranged on the same external surface. It is to be understood that like elements will be labeled using like reference numerals, with the exception that the numerals will be listed in the 200's (e.g., fastener 32 and fastener 232). Unless shown or described otherwise, it is to be understood that elements sharing like reference numerals are substantially similar to those previously described herein. In the illustrated embodiment, the fastener 232 can be substantially similar to the fastener 32 of FIG. 3, with the exception that the base wall 234, first sidewall 236, and second sidewall 238 of fastener 232 each include an opening or elongated slot 254 and an adjacent coupling protrusion 252. This configuration of openings 254 adjacent to protrusions on a base or sidewall can allow the fastener 232 to be combined with other similar fasteners to form a coplanar panel arrangement, or an orthogonal panel arrangement.

Figure 16:
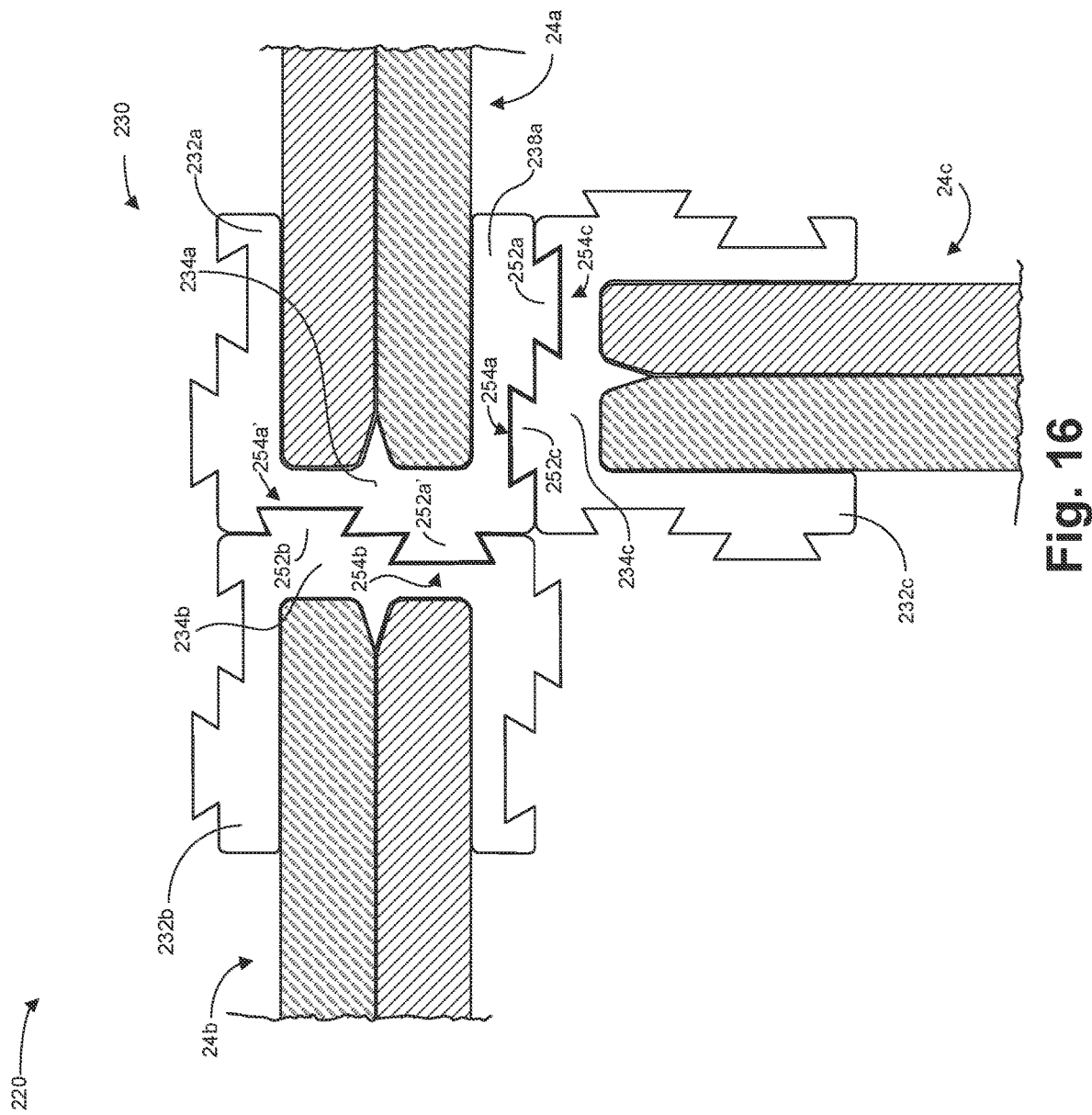
FIG. 16 is a top view of a panel arrangement including a coplanar and orthogonal panel arrangement utilizing three fasteners of the type shown in FIG. 15 with panels shown in cross section.

FIG. 16 illustrates a panel assembly 220 with both a coplanar and orthogonal panel arrangement utilizing the fasteners 232 of FIG. 15. In the illustrated embodiment, a first fastener 232a can be coupled to both a second fastener 232b and a third fastener 232c. The first fastener 232a can be coupled to the third fastener 232c via a first set of a coupling protrusion 252a and opening 254a on a sidewall 238a of the first fastener 232a being engaged with an opening 254c and a coupling protrusion 252c on the base wall 234c of the third fastener 232c. Additionally, the first fastener 232a can be coupled to the second fastener 232b via a second set of a coupling protrusion 252a' and opening 254a' on a base wall 234a of the first fastener 232a being engaged with an opening 254b and a coupling protrusion 252b on the base wall 234b of the second fastener 232b. Thereby allowing a modular fastener 232 to be configured to provide a coplanar panel arrangement (e.g., between panel members 24a and 24b) and an orthogonal panel arrangement (e.g., between panel members 24a and 24b).

Figure 17:
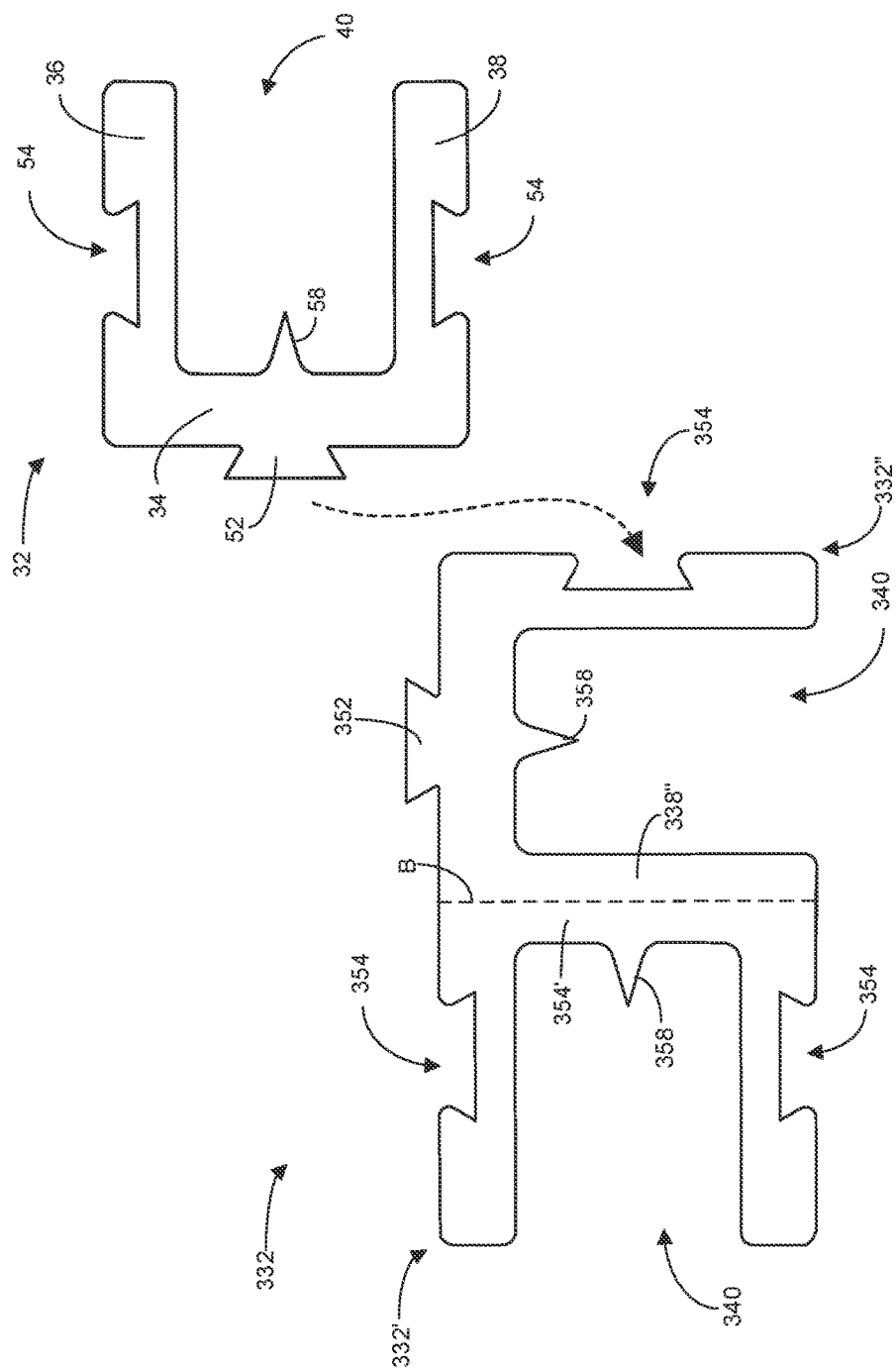
FIG. 17 is a top plan view of a three fastener assembly according to one aspect of the present disclosure.

Referring to FIG. 17, a fastener 332 integrally formed from two fasteners 32 is illustrated. It is to be understood that like elements will be labeled using like reference numerals, with the exception that the numerals will be listed in the 300's (e.g., fastener 32 and fastener 332). Unless shown or described otherwise, it is to be understood that elements sharing like reference numerals are substantially similar to those previously described herein. In the illustrated embodiment, the fastener 332 can be substantially similar to the fastener 32, with the exception that it essentially comprises two fasteners such that the sidewall 338" of a first fastener portion 332" shares a base wall 354' with a second fastener portion 332' (the meeting of these walls illustrated with reference line B). The fastener 332 can provide even further panel configuration possibilities, including allowing for a orthogonal panel arrangement using only the fastener 332, or allowing for an orthogonal and coplanar panel arrangement when combined with fastener 32 in the way illustrated using the dashed reference arrow.

Figure 18:
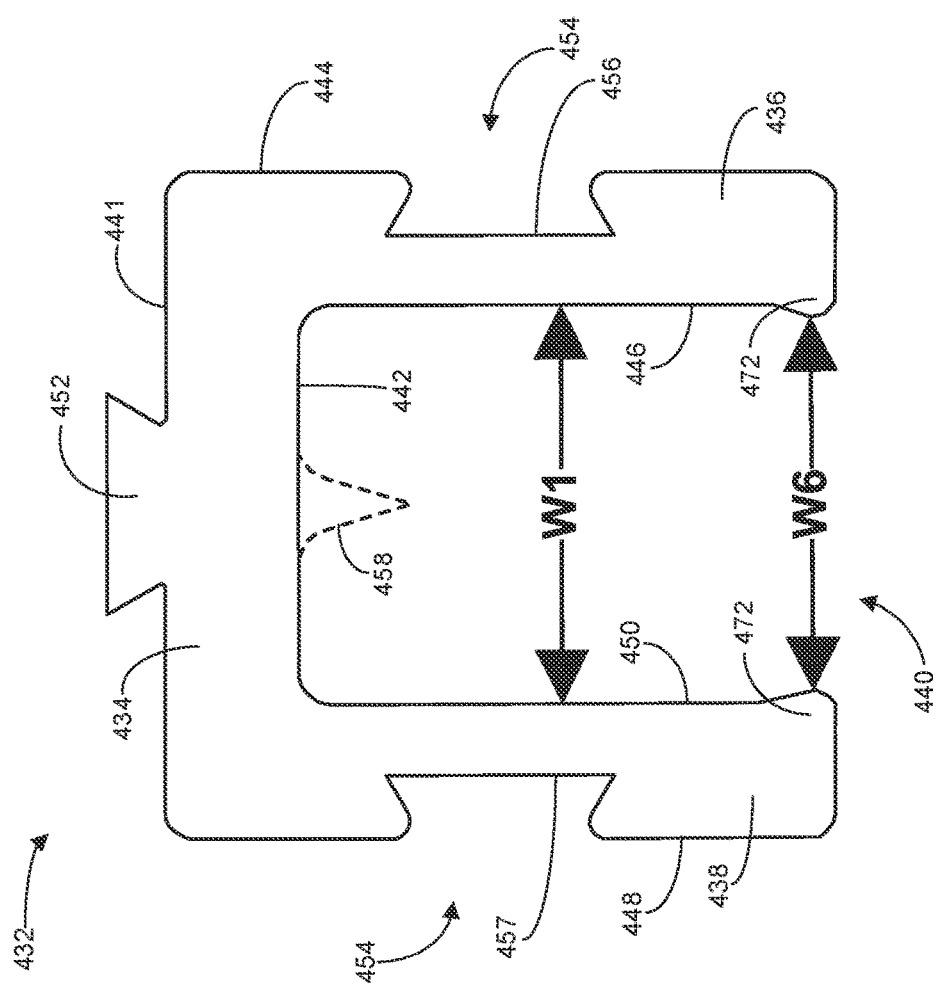
FIG. 18 is a top plan view of a fourth fastener that is consistent with at least some aspects of the present disclosure.

Referring to FIG. 18, a fastener 432 including optional or additional channel protrusions is illustrated. It is to be understood that like elements will be labeled using like reference numerals, with the exception that the numerals will be listed in the 400's (e.g., fastener 32 and fastener 432). Unless shown or described otherwise, it is to be understood that elements sharing like reference numerals are substantially similar to those previously described herein. In the illustrated embodiment, the fastener 432 can be substantially similar to the fastener 32, with the exception that it may optionally include a channel protrusion extending from the floor surface 442 of the base wall 434, and in addition, the fastener 432 can include a pair of opposing side channel protrusions 472. The side channel protrusions 472 can extend into the channel 440 adjacent to an open end from each of the first and second sidewalls 436, 438 or from intermediate locations along the lengths of sidewall members 436 and 438. The side channel protrusions 472 can be configured to bite or grip into side surfaces of a panel member (not shown).

As illustrated, the side channel protrusions 472 can provide a reduced channel opening width dimension W6 relative to the channel width W1. According to some embodiments, the side channel protrusions 472 can protrude from the sidewall between about 0.25 and 2 millimeters. According to a particularly advantageous embodiment, the side channel protrusions 472 can protrude from the sidewall between about 0.5 and 1.5 millimeters. Similar to the channel protrusion 458, the side channel protrusions 472 can extend along the entire length of the fastener 432.

Figure 19:
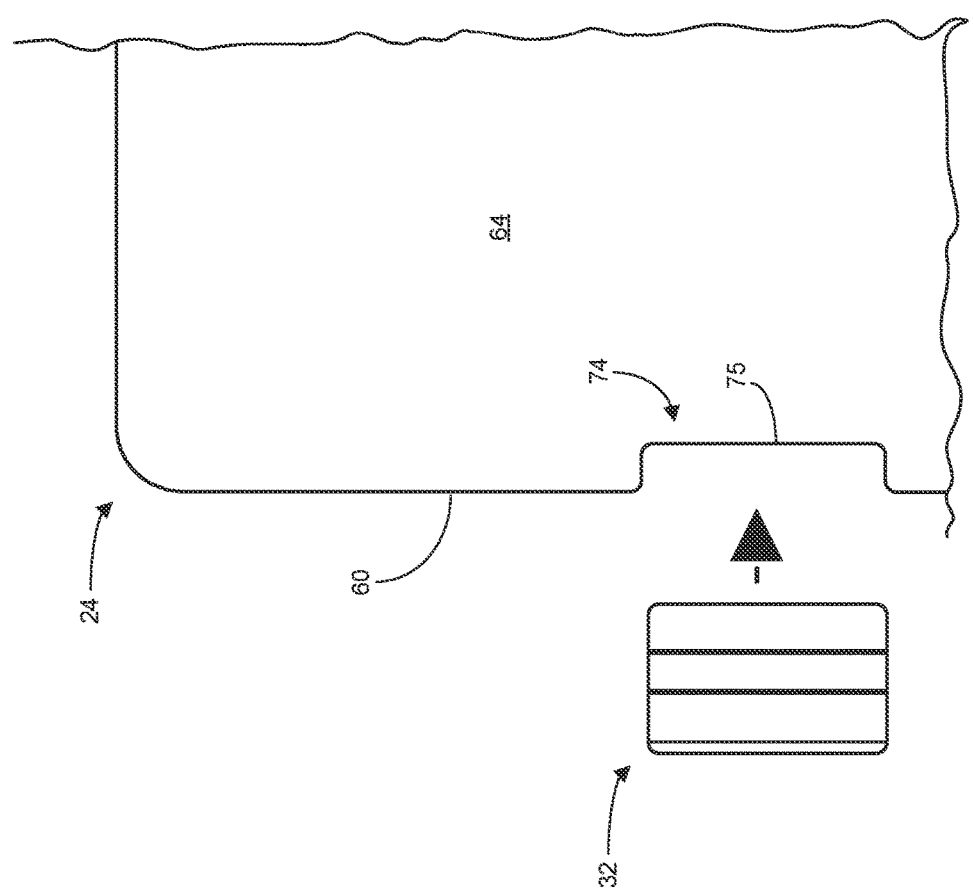
FIG. 19 is a side view of a notched panel member with a fastener ready to be installed thereon.
Figure 20:
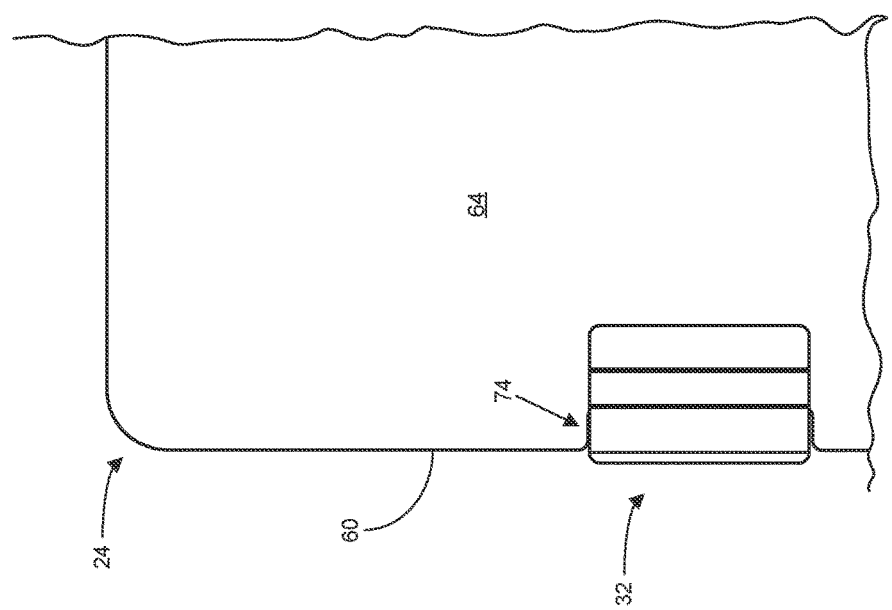
FIG. 20 a side view of the notched panel member of FIG. 19 with the fastener installed.
Figure 21:
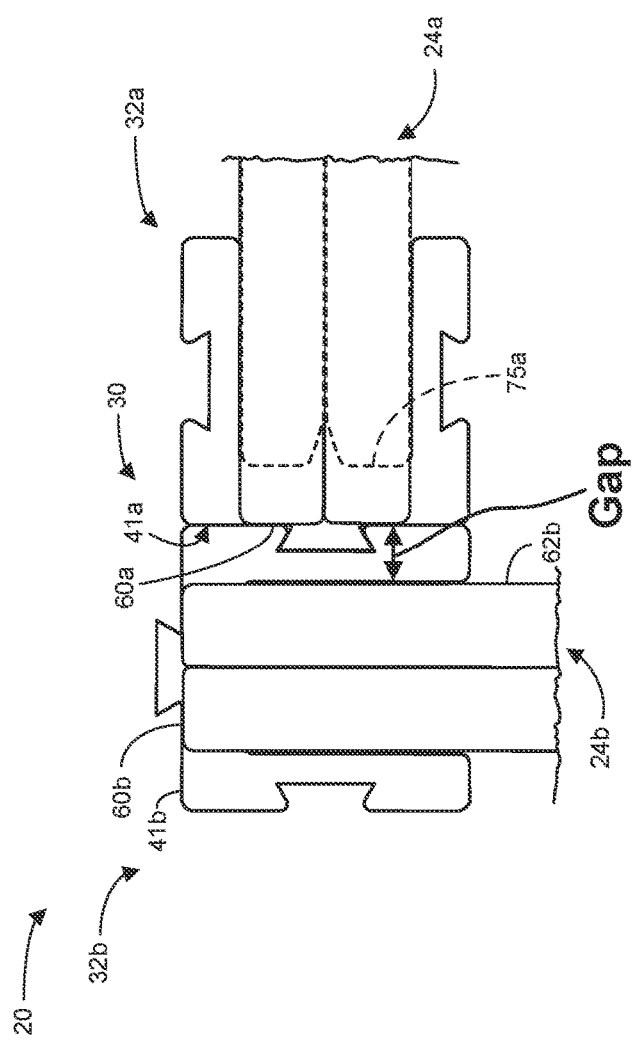
FIG. 21 is a top plan view of a panel assembly utilizing the notched panel members of FIG. 19.

Referring now to FIGS. 19-21, the process of inserting a fastener 32 (e.g., any of the fasteners described herein, such as fastener 32, 132, 232, etc.) onto the panel member 24 including a panel notch 74 is illustrated. The panel notch 74 can be arranged along the edge 60 of the panel member 24. The panel notch 74 can define a notch depth that is approximately equal to a thickness of a base wall of the fastener 32 (see, e.g., T1, FIG. 5). The panel notch 74 can define a notch length that is approximately equal to the length of the fastener 32. The panel notch 74, as will be described, can reduce a gap (see FIG. 21) formed between adjacent panel members of a panel assembly. The fastener 32 can be inserted from the side of the panel member 24 until the edge 75 of the panel notch 74 is fully seated or engaged with the floor surface of the channel 40 (see, e.g., FIG. 10).

As best illustrated in FIG. 21, the notch 75a (illustrated in broken lines) formed in the panel member 24a can reduce the gap formed between an edge 60a of a first panel member 24a to a surface 62b of an adjacent, second panel member 24b. In the illustrated embodiment, the edge 60a of the panel member 24a can be flush, or aligned with, the outer surface 41a of the fastener 32a.

Figure 22:
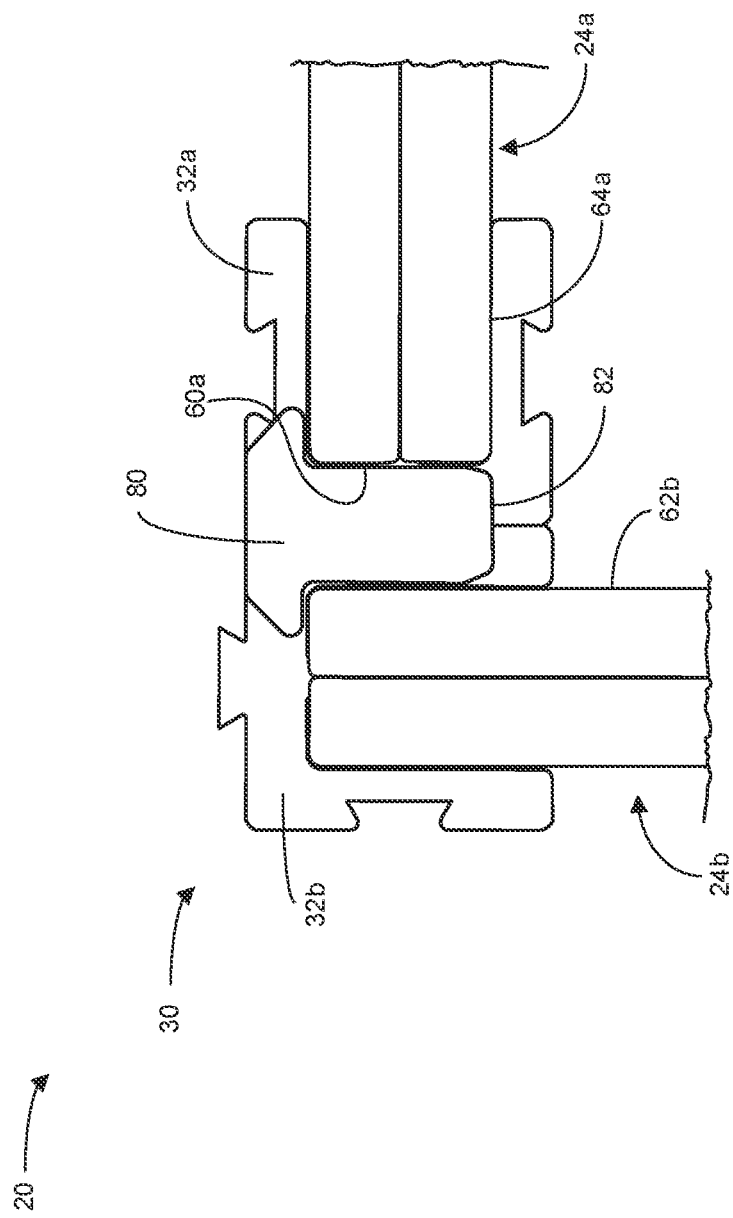
FIG. 22 is a top plan view of a panel assembly with a panel gap closing strip between adjacent panel members.

According to some embodiments, it may be preferred to close the gap between adjacent panel members utilizing a gasket or strip configured to fill in the gap, which can provide even further privacy or a more attractive appearance. One such embodiment of a gap closing strip 80 is illustrated in FIG. 22. The gap closing strip 80 is configured to be placed between an edge 60a of a first panel member 24a and a surface 62b of a second, adjacent panel member 24b. It is also specifically contemplated that the same or similar strip 80 could be utilized between edges of panel members in a coplanar arrangement (e.g., FIG. 14). In the illustrated embodiment, the strip 80 can define a T-shaped profile or cross section enabling the strip to fit securely against outer edges or surfaces of the panel members 24a, 24b. The strip 80 can be formed from rubber, an elastomeric material, a foam material, among others. In the illustrated embodiment, the dimensions of the strip 80 can be configured such that the tip 82 of the strip 80 is flush with a surface 64a of the panel member 24a.

Figure 23:
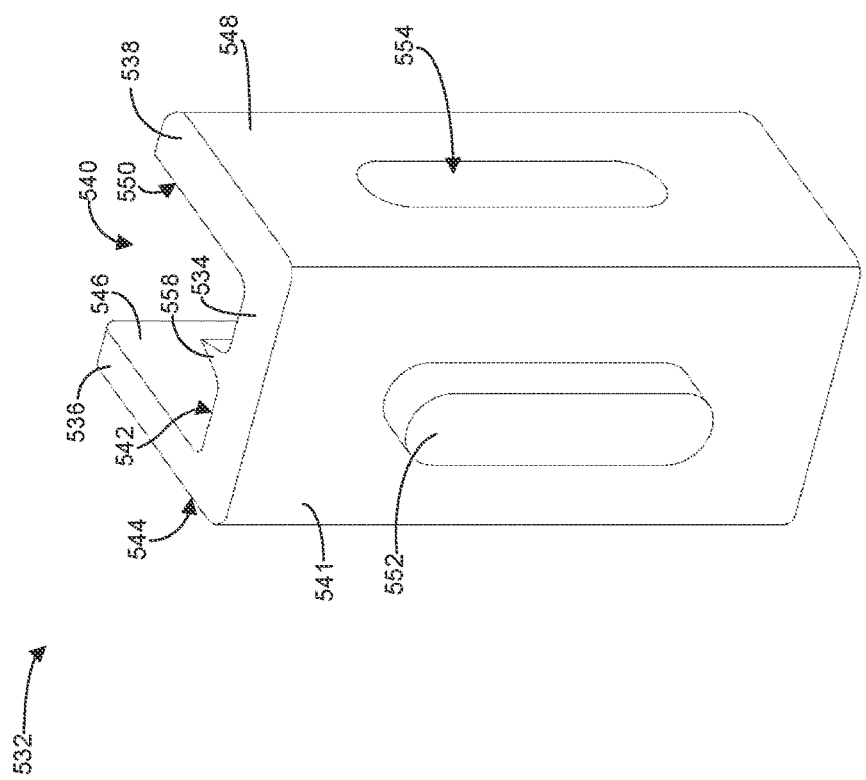
FIG. 23 is a first perspective view of another fastener that is consistent with at least some aspects of the present disclosure.
Figure 24:
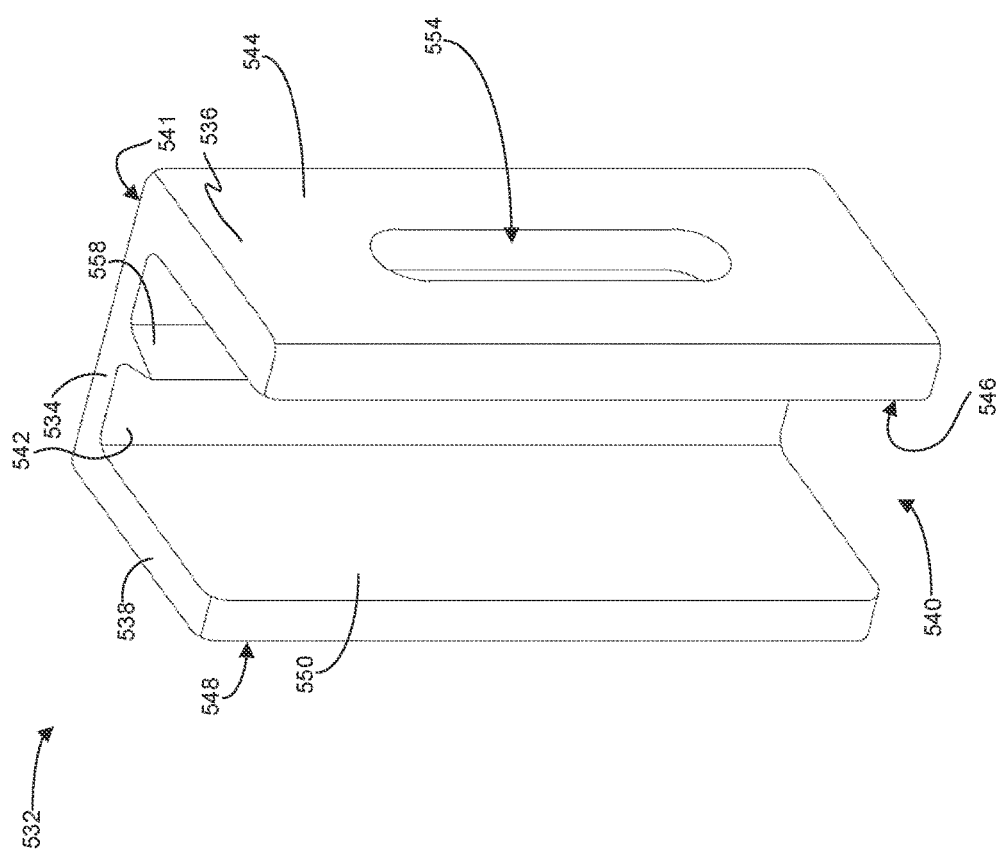
FIG. 24 is a second perspective view of the fastener of FIG. 23.
Figure 25:
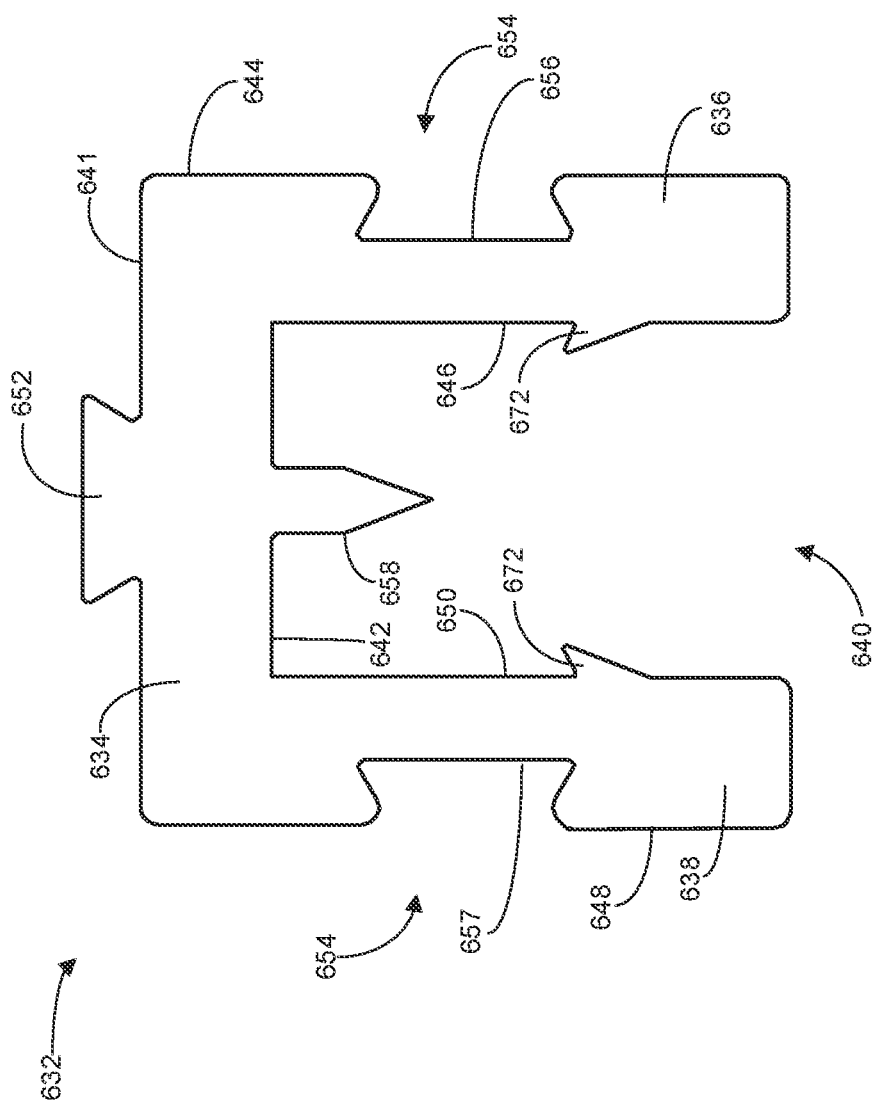
FIG. 25 is a perspective view of a fastener assembly including two instances of the fastener of FIG. 23.

According to some embodiments, the openings and coupling slots can be configured as structures other than trapezoidal slots/openings. For example, the openings and coupling slots can be configured as T-shaped structures (see FIG. 32). FIGS. 23-25 illustrate a fastener 532 with openings 554 configured as pill-shaped openings and coupling protrusions 552 configured as complementarily shaped protrusions. It is to be understood that like elements will be labeled using like reference numerals, with the exception that the numerals will be listed in the 500's (e.g., fastener 32 and fastener 532). Unless shown or described otherwise, it is to be understood that elements sharing like reference numerals are substantially similar to those previously described herein.

In the illustrated embodiment, the fastener 532 can be substantially similar to the fastener 32 of FIG. 3, with the exception that the size and shape of the openings 554 and coupling protrusions 552. For example, in the illustrated embodiment, the coupling protrusion 552 is arranged around a midpoint of the length dimension of the fastener 532. The coupling protrusion 552 extends along only a portion of the overall length of the base wall 534 of the fastener 532. Similarly, the pill-shaped openings 554 are arranged around a midpoint of the length dimension of the fastener 532. The openings 554 extend along only a portion of the overall length of the first and second sidewalls 536, 538 of the fastener 532. In the illustrated embodiment, the openings 554 can extend from the first and second external surfaces 544, 548 towards the first and second internally facing surfaces 546, 550, respectively. As best illustrated in FIG. 24, the openings 554 extend partially through the thickness of the first and second sidewalls 536, 538. In other embodiments, the openings 554 can extend all the way through the thickness of the first and second sidewalls 536, 538.

As best illustrated in FIG. 25, when the coupling protrusion 552a of the first fastener 532a is received within an opening 554b of the second fastener 532b, an outer surface 541a of the base wall 534a on the first fastener 532a is directly adjacent to one of the first or second external surfaces 544b, 548b on the second fastener 532b. In the illustrated embodiment, the outer surface 541a on the first fastener 532a is directly adjacent to the first external surface 544b on the second fastener 532b.

Figure 26:
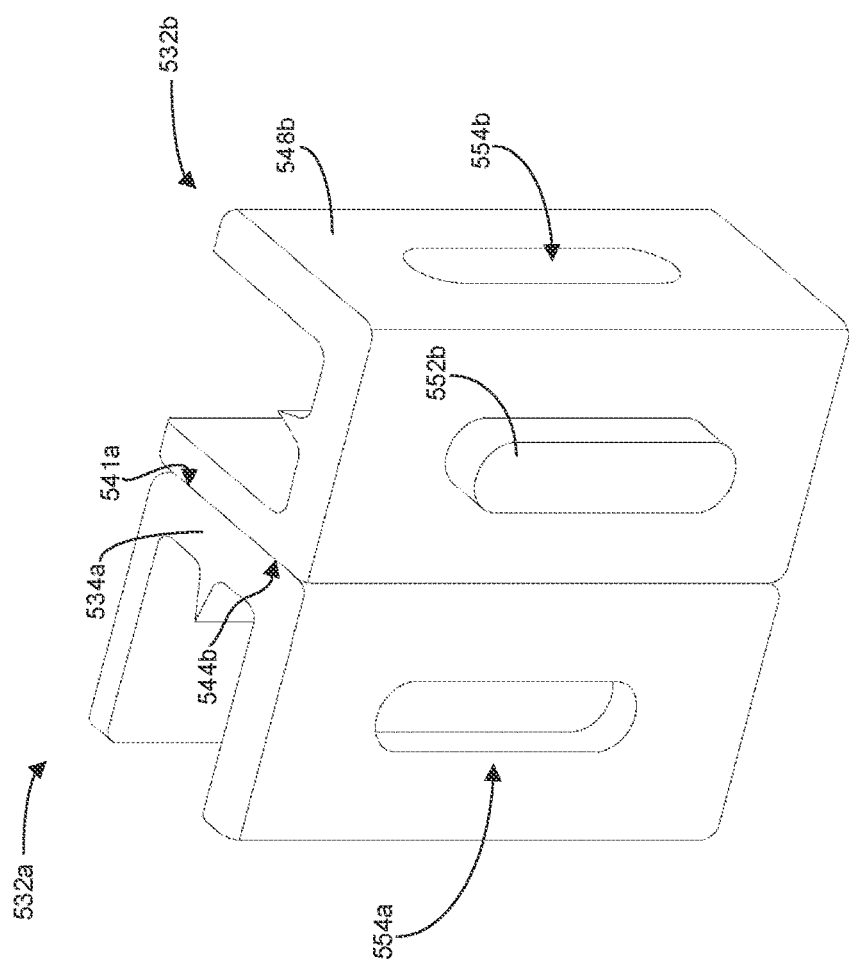
FIG. 26 is a top plan view of yet another fastener that is consistent with at least some aspects of the present disclosure.
Figure 27:
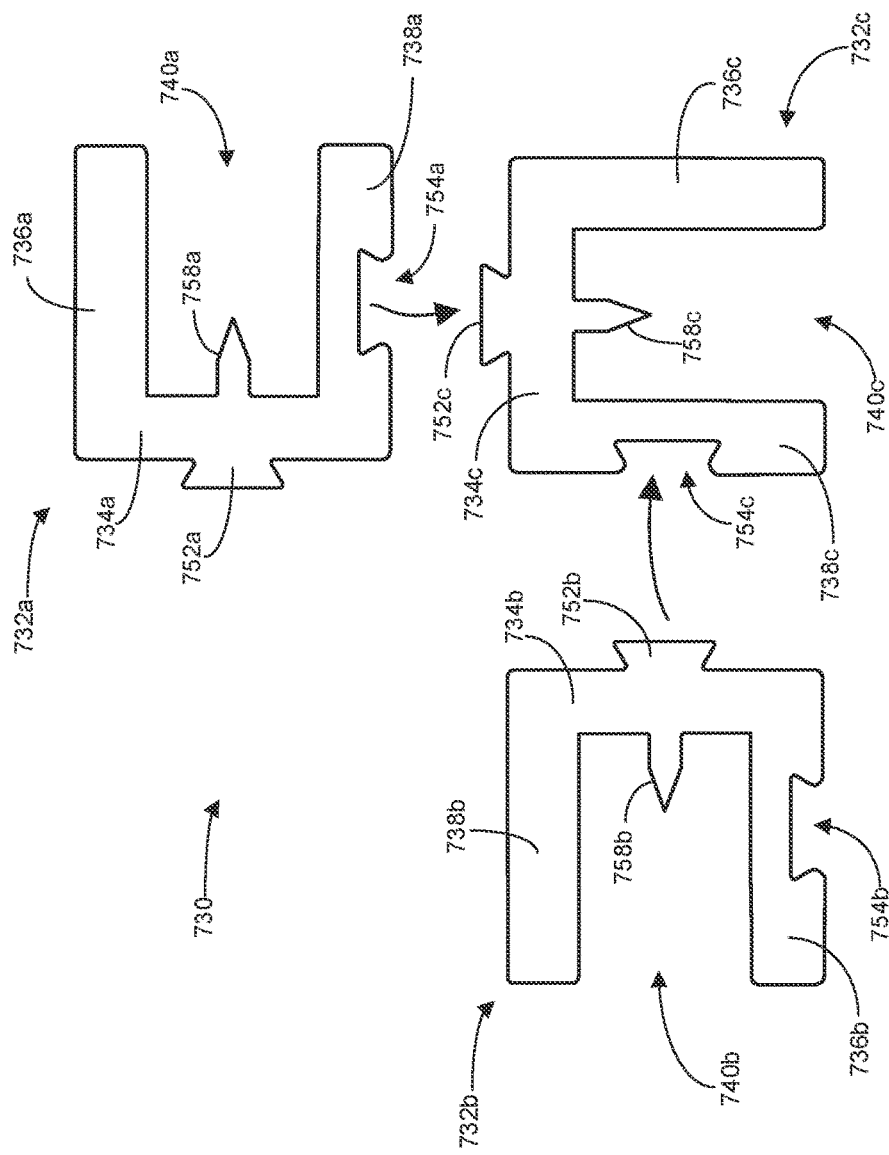
FIG. 27 is a top view of a fastener assembly including simplified fasteners according that are consistent with at least some aspects of the present disclosure.

Referring to FIGS. 26 and 27, a fastener 632 having a different configuration of channel protrusions. It is to be understood that like elements will be labeled using like reference numerals, with the exception that the numerals will be listed in the 600's (e.g., fastener 32 and fastener 632). Unless shown or described otherwise, it is to be understood that elements sharing like reference numerals are substantially similar to those previously described herein. In the illustrated embodiment, the fastener 632 can be substantially similar to the fastener 432, with the exception that the channel protrusion 658 extending from the floor surface 642 of the base wall 634 defines a different cross-sectional shape, and in addition, the pair of opposing side channel protrusions 672 are shaped and oriented differently. For example, the channel protrusion 658 can define a cross section with a rectangular portion adjacent to the base wall 634 and a triangular portion at a distal end of the channel protrusion 358. The side channel protrusions 672 can extend into the channel 640 from each of the first and second sidewalls 636, 638 between an open end of the channel 640 and the base wall 634. Similar to fastener 432, the side channel protrusions 672 can be configured to bite or grip into side surfaces of a panel member (not shown). In the illustrated example, protrusions 672 extend into the channel and angle back toward floor surface 642, having sloped surfaces that face away from the open side of the channel to form ramps for receiving the edge of a screen when pressed into the channel. In some cases the protrusions 672 are triangular in cross section. Protrusions 672 may extend into the channel anywhere from 1/20 to 1/4 the width of the channel.

Figure 28:
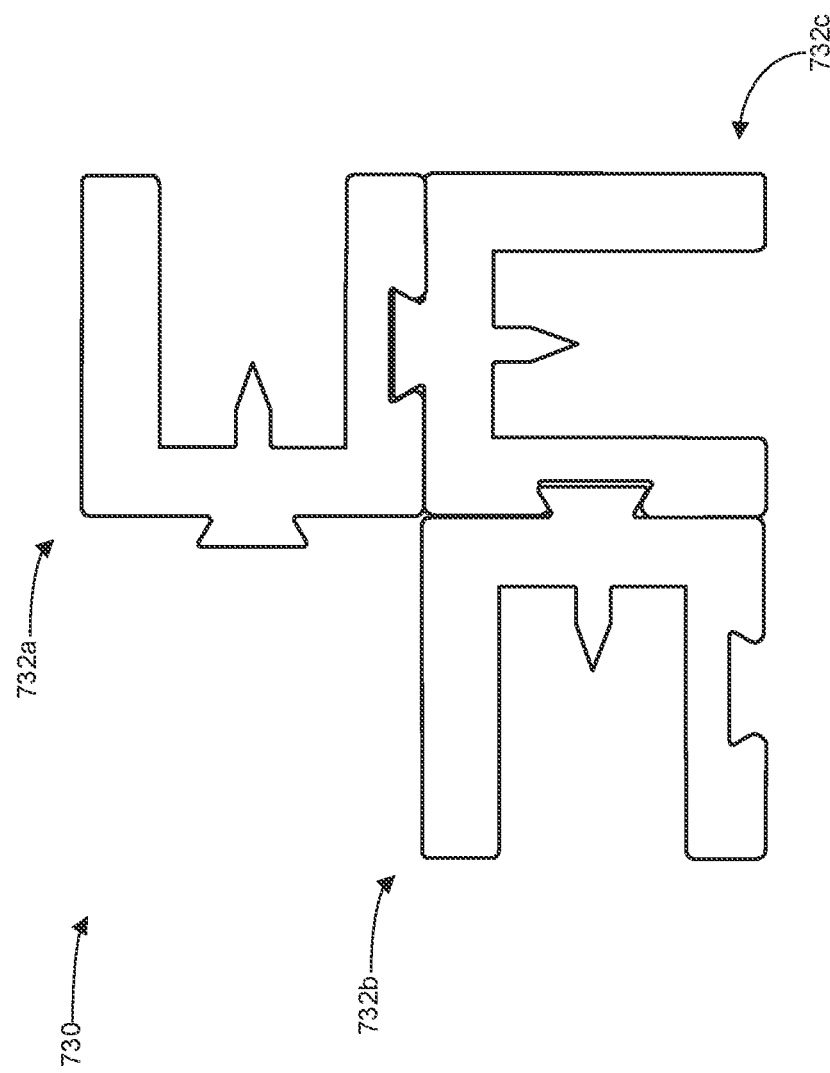
FIG. 28 is a top plan view of the fastener assembly of FIG. 27 in an assembled state.

Referring now to FIGS. 27 and 28, a simplified fastener 732 in various configurations is illustrated. It is to be understood that like elements will be labeled using like reference numerals, with the exception that the numerals will be listed in the 700's (e.g., fastener 32 and fastener 732). Unless shown or described otherwise, it is to be understood that elements sharing like reference numerals are substantially similar to those previously described herein. In the illustrated embodiment, the fastener 732 can be substantially similar to the fastener 32 of FIG. 3, with the exception that each fastener 732 only includes one coupling protrusion 752 and one opening 754. In the illustrated embodiment, the opening 754 can be arranged on either the first sidewall 736 or the second sidewall 738. Fasteners 732*a* and 732*c* illustrate a first configuration of a fastener, where the openings 738*a*, 738*c* are arranged, respectively, on the second sidewall 754*a*, 754*c*. Fastener 732*b* illustrate a second configuration of a fastener, where the opening 754*b* is arranged on the first sidewall 736*b*. The modularity of the fastener assembly 730 can therefore be increased by providing two distinct fastener configurations, while at the same time, allowing for a simplified fastener geometry. For example, in the illustrated embodiment, three panel members (not shown) can be arranged in close proximity.

While the invention may be susceptible to various modifications and alternative forms, specific embodiments have been shown by way of example in the drawings and have been described in detail herein. However, it should be understood that the invention is not intended to be limited to the particular forms disclosed. For example, any of the fastener features described above in the context of one of the embodiments may be used in other embodiments. For instance, the channel protrusions 472 in the FIG. 18 embodiment or protrusions 672 in the FIG. 26 embodiment may be included in the FIG. 15 embodiment. As another example, while fasteners are shown above as including two lateral channel protrusions (see FIGS. 18, 26), in other embodiments a fastener may only include a single lateral channel protrusion. In still other cases a fastener may include more than one lateral channel protrusion per side wall member that extends into the fastener channel.

Figure 30:
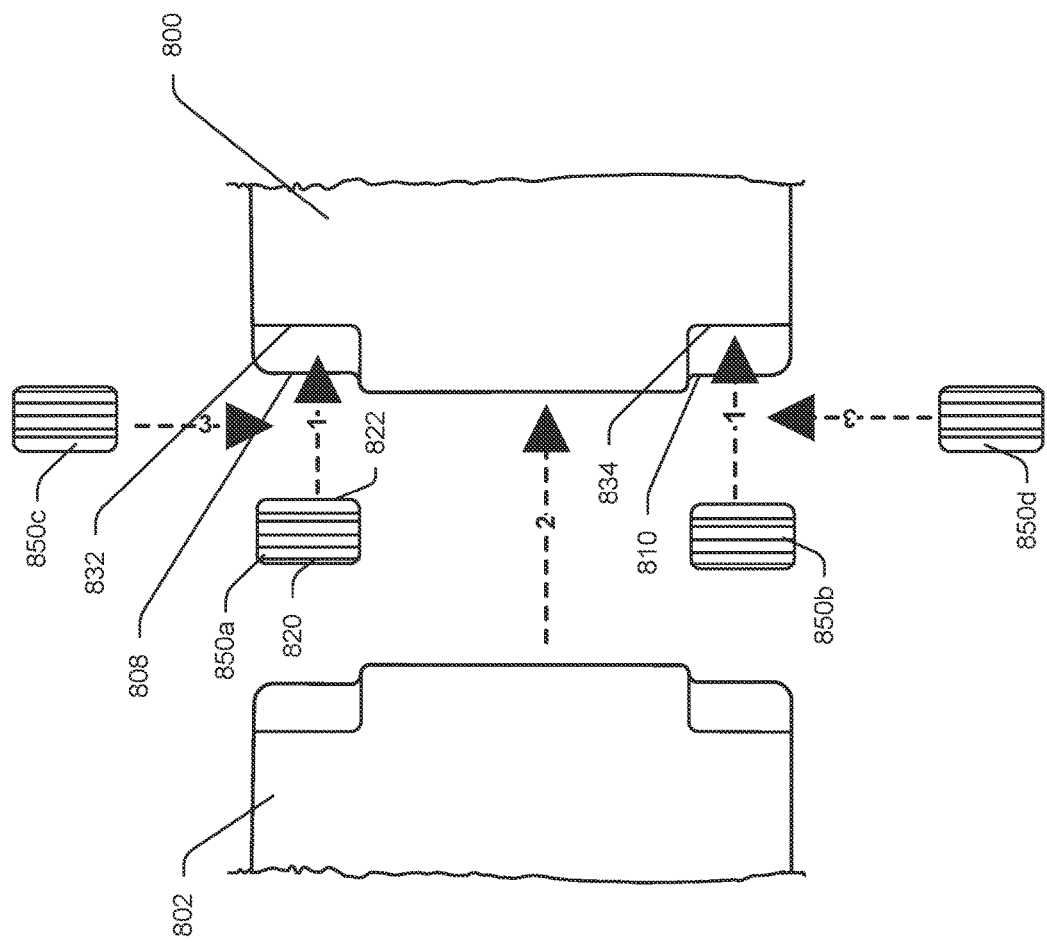
FIG. 30 shows an exploded partial side view of the assembly components from FIG. 29.

As another example, FIG. 30 shows two fasteners 850*a* and 850*c* akin to the fasteners described above with respect to FIG. 15 with first and second four layer panel subassemblies 800, 802 shown in phantom and with lateral edges abutting each other. Each panel assembly includes two inner panel members and two outer panel members. Here, referring also to FIG. 31, each inner panel member (one labelled 806) forms upper and lower corner notch cutouts 808 and 810 that have a depth from the lateral edge that is equal to a dimension between the outer surface 820 of the base wall member the inner surface 826 of the base wall member. The combined thickness of the inner panel members is similar to the width of the channel formed by the fasteners so that the edge of the inner panel members can be received within the channel as described above.

The outer panel members (one labelled 830) form upper and lower corner notch cutouts 832 and 834 that have a depth from the lateral edge that is equal to a dimension between the outer surface 820 of the base wall member of one of the fasteners 850 and the distal end of one of the fastener leg member 822. Each outer panel member (e.g., 830) has a thickness dimension that is similar to the thickness of one of the lateral walls (e.g., 840 in FIG. 29) of the fastener 850*a*.

Figure 29:
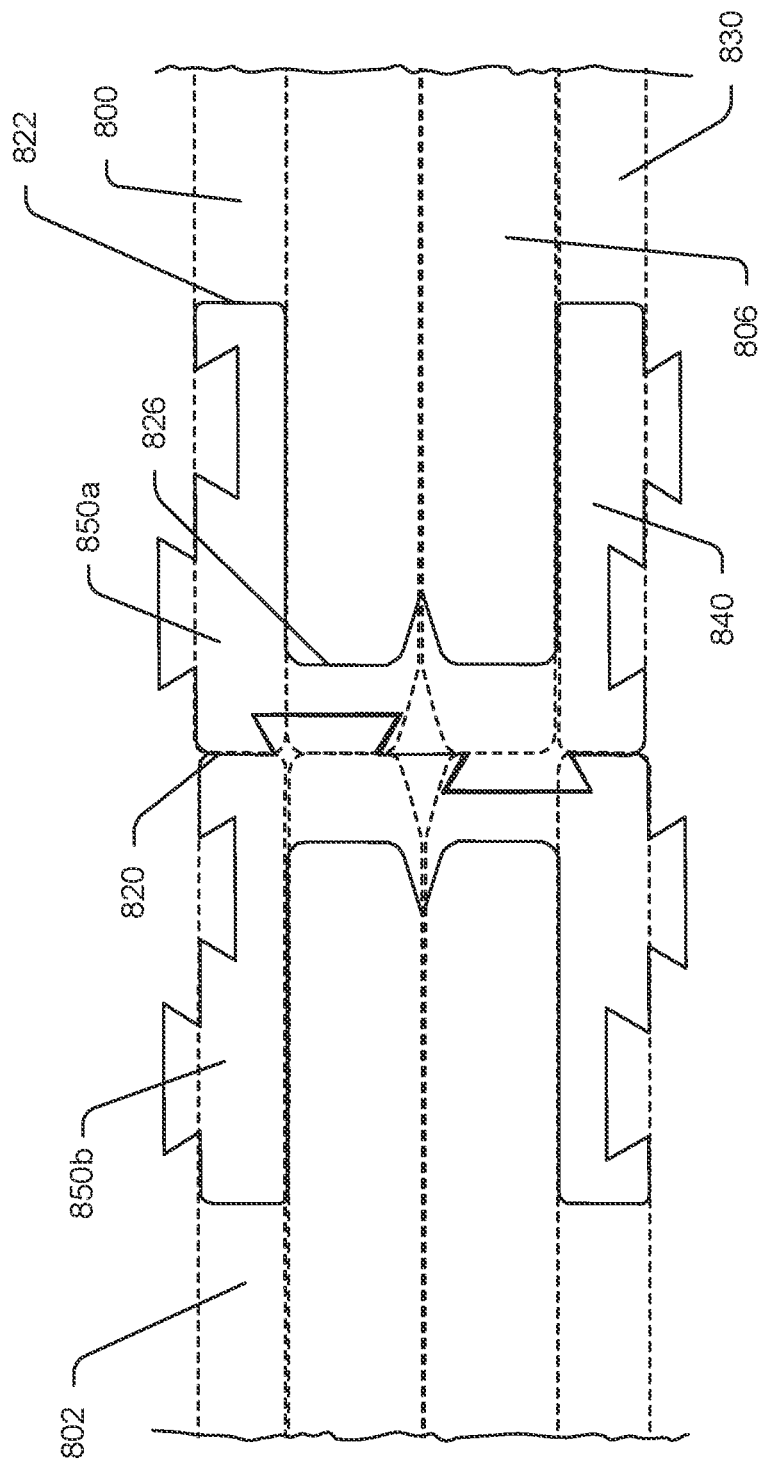
FIG. 29 is a partial top plan view of fasteners akin to the FIG. 15 fasteners, albeit connecting four layer panel substructures that is consistent with at least some aspects of the present disclosure.
Figure 31:
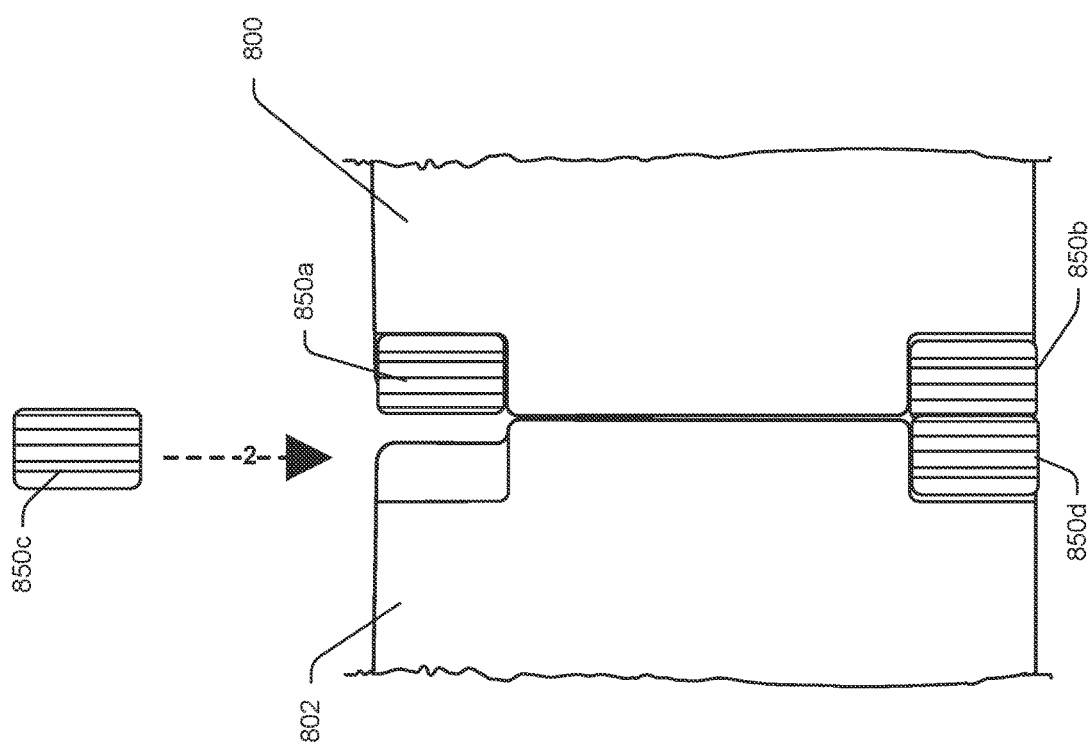
FIG. 31 shows a partial assembly of the components from FIG. 30.

Referring still to FIGS. 29 and 30, to secure the two panel subassemblies 800 and 802 together in an end to end abutting fashion, first and second fasteners 850*a* and 850*b* are aligned with the notches formed at the corners of the first subassembly 800 and inner panel member corner edges at the notches are forced into the fastener channels as indicated by arrows marked "1" in FIG. 29. Thereafter, the fasteners 850*a* and 850*b* are secured as shown in FIG. 31. At this point, the lateral edge of panel subassembly 800 should be substantially flush with the outer surfaces of the base members of the fasteners 850*a* and 850*b* (see again FIG. 29). Also, at this time, the outer (e.g., front and rear) surfaces of the panel subassembly 800 should be substantially flush with the outer or external surfaces of the lateral arm members (e.g., 840 in FIG. 29) that form fasteners 850*a* and 850*b* (see again FIG. 29).

Next, second panel subassembly 802 can be moved to a position with its lateral side edge abutting the lateral edge of first panel subassembly 800 as shown in FIG. 31 and as indicated by the arrow labelled "2" in FIG. 29. Continuing, two other fasteners 850*c* and 850*d* can be moved as indicated by the arrows labelled "3" in FIG. 29 to receive inner panel member corner portions in the fastener channels and so that the base wall couplers couple to the base wall couplers of fasteners 50*a* and 850*b*, respectively. In FIG. 31 fastener 850*d* is shown coupled to fastener 850*b* and connected to panel subassembly 802 while fastener 850*c* is shown still separated from the other assembly components.

In the FIGS. 29-31 embodiment it should be appreciated that, once the components are assembled as described, there is no gap or only a very minimal gap between adjacent panel subassembly edges. It should also be appreciated that because the outer panel members have larger notches with thicknesses that are similar to the thicknesses of the fastener arm members, the outer surfaces of the panel subassemblies are substantially flush with the outer surfaces of the fasteners. While not shown, other panel subassemblies could be added to the FIG. 31 assembly to provide T or X panel arrangements.

In still other embodiments, the panel subassemblies in FIGS. 29 through 31 may include three as opposed to two panel layer members where the central layer member fills the width of the fasteners. In some embodiments only one outer panel member in a laminated panel subassembly may include the deep corner notches so that only one outer panel surface is flush with external surfaces of fasteners attached thereto.

Figure 32:
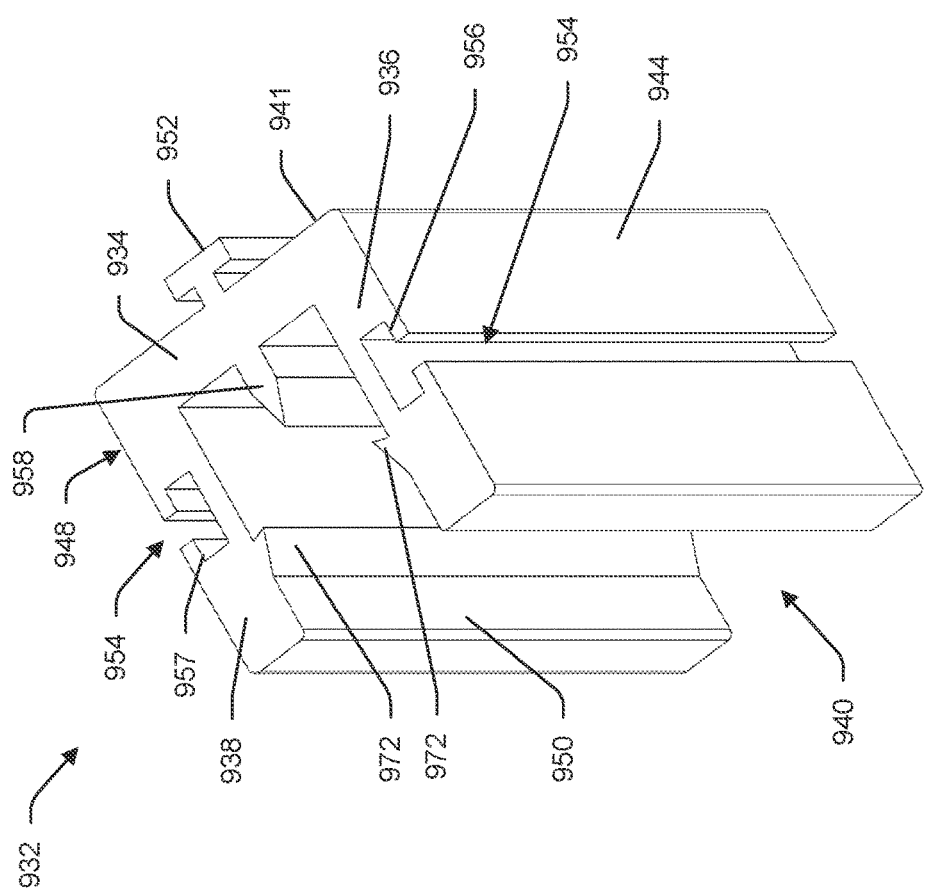
FIG. 32 is a perspective view of a fastener with "T-shaped" openings and protrusions consistent with at least some aspects of the present disclosure.

Referring to FIG. 32, a fastener 932 having a different configuration of coupling protrusions 952 and openings 954. It is to be understood that like elements will be labeled using like reference numerals, with the exception that the numerals will be listed in the 900's (e.g., fastener 32 and fastener 932). Unless shown or described otherwise, it is to be understood that elements sharing like reference numerals are substantially similar to those previously described herein. In the illustrated embodiment, the fastener 932 can be substantially similar to the fastener 632, with the exception that the coupling protrusion 952 extending from outer surface 941 of the base wall 934 and the openings 954 formed in the first and second sidewalls 936, 938 define a different cross-sectional shape. For example, the coupling protrusion 952 can define a "T-shaped" cross section comprising two rectangular shaped portions arranged orthogonal to each other. Correspondingly, the openings 954 can define complementarily shaped first and second slots 956, 957 to receive the T-shaped coupling protrusion 952.

In still other embodiments it is contemplated that other workstation or office affordances may be mounted to one or more of the panel fasteners for securing the other affordances to a panel assembly. For instance, see again FIG. 11 where a fastener 1000 has a coupler for connecting to one of the fasteners that receives panels at a workstation and where other affordances are represented generally by the phantom bubble 1002 which may include, for instance, a hook, a speaker, a fan, a camera, a battery pack, a light, signage, a shelf, a pencil holder, etc. In some cases one of the affordances may span between two fasteners.

In some cases one or more of the fasteners may connect to an upper or lower edge of a panel member and may secure to another fastener that supports a panel in a substantially horizontal arrangement. For example, a panel may provide an overhead surround type false ceiling structure at a workstation.

As another example, while the panel assemblies are described in the context of workstations, it should be appreciated that other applications including standalone panel assemblies for room or space division. Also, panels may only extend along portions of edges of worktops at workstations or other locations.

Referring again to FIG. 1, in at least some embodiments it will be important to have other support features in addition to the disclosed fasteners where the other features combined with the fasteners result in sufficient support to maintain panels in desired juxtapositions.

Thus, the invention is to cover all modifications, equivalents, and alternatives falling within the spirit and scope of the invention as defined by the following appended claims.

To apprise the public of the scope of this invention, the following claims are made:

What is claimed is:

1. A privacy screen assembly comprising:
   a first panel assembly including a first panel layer attached to a second panel layer, the first panel assembly having first and second opposite side surfaces and a first panel width dimension between the first and second opposite side surfaces along an edge;
   a fastener clip including:
   (i) a base wall member forming a floor surface;
   (ii) first and second sidewall members that are spaced apart and extend from the base wall member in substantially the same direction, the first and second sidewall members including first and second facing internal surfaces, respectively, the first and second facing internal surfaces and the floor surface forming a channel having a substantially uniform channel width dimension between the first and second facing internal surfaces that is similar to the first panel width dimension; and
   (iii) a first floor channel protrusion extending from the floor surface into the channel to a distal end along a trajectory that is substantially parallel to the first and second facing internal surfaces, the first floor channel protrusion having first and second surfaces that face the first and second facing internal surfaces, respectively;
   wherein, the edge is received within the channel with the distal end of the first floor channel protrusion jammed into the edge of the first panel assembly so that at least portions of the first panel assembly are compressed between the first floor channel protrusion and the first and second facing internal surfaces of the first and second sidewall members, respectively; and
   wherein each of the first and second panel layers has a thickness dimension that is greater than a width dimension between the first floor channel protrusion and one of the first and second facing internal surfaces that form the channel.

2. The privacy screen assembly of claim 1 wherein the first and second facing internal surfaces extend to distal edges, first and second distal portions of the first and second facing internal surfaces adjacent the distal edges are flat and substantially parallel, the fastening clip further including:
   a first side channel protrusion extending from an intermediate portion of the first facing internal surface adjacent the first distal portion into the channel from a location spaced from the floor surface, the first side channel protrusion forming a first sloped surface that angles away from the first facing internal surface and toward the floor surface; and
   a second side channel protrusion extending from an intermediate portion of the second facing internal surface adjacent the second distal portion into the channel from a location spaced from the floor surface, the second side channel protrusion forming a second sloped surface that angles away from the second facing internal surface and toward the floor surface.

3. The privacy screen assembly of claim 2 wherein portions of the first facing internal surface and the second facing internal surface adjacent the floor surface are flat and parallel.

4. The privacy screen assembly of claim 3 wherein the first side channel protrusion is at least in part triangular in cross section including, in addition to the first sloped surface, a third sloped surface that angles away from the first facing internal surface and toward the floor surface and the second side channel protrusion is at least in part triangular in cross section including, in addition to the second sloped surface, a fourth sloped surface that angles away from the second facing internal surface and toward the floor surface.

5. The privacy screen assembly of claim 4 wherein the first floor channel protrusion includes a rectangular portion adjacent the floor surface that has the first and second surfaces which are substantially perpendicular to the floor surface and a triangular portion that extends from the rectangular portion and that has first and second side surfaces that are angled toward each other from the rectangular portion outward to form an apex.

6. The privacy screen assembly of claim 5 wherein the distal end of the first floor channel protrusion ends at a channel depth that is deeper than the first and second side channel protrusions.

7. The privacy screen of claim 1 wherein the first floor channel protrusion has a length dimension within a range between one tenth of an inch and half an inch.

8. The privacy screen of claim 1 wherein the first floor channel protrusion is triangular in cross section and extends along a length dimension of the channel.

9. The privacy screen assembly of claim 1 wherein the panel width dimension of the first panel assembly is greater than the width dimension of the channel by a dimension within a range of 2/100 of an inch and 1/10 of an inch.

10. The privacy screen assembly of claim 1 wherein the first and second surfaces of the channel protrusion angle toward each other from a base end adjacent the floor surface to the distal end.

11. The privacy screen assembly of claim 1 wherein each panel layer is formed out of pressed fiber material.

12. The privacy screen assembly of claim 1 wherein each panel layer is resiliently compressible.

13. The privacy screen of claim 1 wherein the first floor channel protrusion includes a rectangular portion adjacent the floor surface and a triangular portion that extends from the rectangular portion in a direction away from the floor surface.

14. The privacy screen assembly of claim 1 wherein the first sidewall member includes a first external surface opposite the first facing internal surface, the screen assembly further including:
- a second panel assembly including a third panel layer attached to a fourth panel layer, the second panel assembly having first and second opposite side surfaces and a second panel width dimension between the first and second opposite side surfaces along an edge;
- the fastener clip further including:
  (i) third and fourth sidewall members that are spaced apart and extend from the first external surface in substantially the same direction, the third and fourth sidewall members including third and fourth facing internal surfaces, respectively, the third and fourth facing internal surfaces and the first external surface forming a second channel having a substantially uniform second channel width dimension between the third and fourth facing internal surfaces that is similar to the second panel width dimension; and
  (iii) a second floor channel protrusion extending from the first external surface into the second channel to a distal end along a trajectory that is substantially parallel to the third and fourth facing internal surfaces, the second floor channel protrusion having first and second surfaces that face the third and fourth facing internal surfaces, respectively;
- wherein, the edge of the second panel assembly is received within the second channel with the distal end of the second floor channel protrusion jammed into the edge of the second panel assembly so that at least portions of the second panel assembly are compressed between the second floor channel protrusion and the third and fourth facing internal surfaces of the third and fourth sidewall members, respectively; and
- wherein each of the third and fourth panel layers has a thickness dimension that is greater than a width dimension between the second floor channel protrusion and one of the third and fourth facing internal surfaces that form the second channel.

\* \* \* \* \*

UNITED STATES PATENT AND TRADEMARK OFFICE
CERTIFICATE OF CORRECTION

PATENT NO. : 12,025,176 B2
APPLICATION NO. : 17/204538
DATED : July 2, 2024
INVENTOR(S) : Daniel Paulucci et al.

Page 1 of 1

It is certified that error appears in the above-identified patent and that said Letters Patent is hereby corrected as shown below:

In the Claims

Claim 7, Column 20, Line 44, "screen of" should be --screen assembly of--.

Claim 8, Column 20, Line 47, "screen of" should be --screen assembly of--.

Claim 13, Column 20, Line 63, "screen of" should be --screen assembly of--.

Signed and Sealed this
Second Day of September, 2025

Coke Morgan Stewart
*Acting Director of the United States Patent and Trademark Office*